(12) United States Patent
Sugae et al.

(10) Patent No.: US 11,125,874 B2
(45) Date of Patent: Sep. 21, 2021

(54) OBSTACLE DETECTION SENSOR

(71) Applicant: AISIN SEIKI KABUSHIKI KAISHA, Kariya (JP)

(72) Inventors: Ippei Sugae, Chita-gun (JP); Eiji Niwa, Nagoya (JP); Hisashi Inaba, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 469 days.

(21) Appl. No.: 16/226,840

(22) Filed: Dec. 20, 2018

(65) Prior Publication Data
US 2019/0196010 A1    Jun. 27, 2019

(30) Foreign Application Priority Data

Dec. 21, 2017 (JP) .............................. JP2017-245529
Dec. 21, 2017 (JP) .............................. JP2017-245530
Dec. 21, 2017 (JP) .............................. JP2017-245531

(51) Int. Cl.
*G01S 15/10* (2006.01)
*G01S 7/527* (2006.01)
(Continued)

(52) U.S. Cl.
CPC ............ *G01S 15/104* (2013.01); *G01S 7/521* (2013.01); *G01S 7/5273* (2013.01); *G01S 15/04* (2013.01);
(Continued)

(58) Field of Classification Search
CPC ........ G01S 15/104; G01S 15/86; G01S 7/521; G01S 15/325; G01S 15/32; G01S 15/04;
(Continued)

(56) References Cited

U.S. PATENT DOCUMENTS 7,496,157 B2    2/2009    Katou et al.
9,606,539 B1    3/2017    Kentley et al.
(Continued)

FOREIGN PATENT DOCUMENTS

CN    107656283 A  *  2/2018
CN    109991609 A  *  7/2019  ........... G01S 7/5273
(Continued)

OTHER PUBLICATIONS

Communication dated Apr. 24, 2019, from the European Patent Office in counterpart application No. 18213834.7.

*Primary Examiner* — Daniel Pihulic
(74) *Attorney, Agent, or Firm* — Sughrue Mion, PLLC

(57) ABSTRACT

An obstacle detection sensor includes: a controller configured to determine a detection condition of an obstacle on a road; a distance sensor unit configured to acquire distance information by oscillating a vibration wave and receiving a reflected wave of the oscillated vibration wave; a communication unit configured to communicate with an outside to acquire road surface information; and a storage unit configured to store detection relationship information for identifying the obstacle based on the distance information, in which the controller compares the detection relationship information read from the storage unit with the distance information and the road surface information acquired from the distance sensor unit and the communication unit to determine the detection condition.

15 Claims, 7 Drawing Sheets

(51) Int. Cl.
*G01S 15/93* (2020.01)
*B06B 1/02* (2006.01)
*G01S 15/931* (2020.01)
*G01S 7/521* (2006.01)
*G01S 15/32* (2006.01)
*G01S 15/04* (2006.01)
*G01S 15/86* (2020.01)
*G01S 13/931* (2020.01)

(52) U.S. Cl.
CPC ............ *G01S 15/32* (2013.01); *G01S 15/325* (2013.01); *G01S 15/86* (2020.01); *G01S 15/931* (2013.01); *B06B 1/0238* (2013.01); *B06B 2201/55* (2013.01); *G01S 2013/9316* (2020.01); *G01S 2013/9322* (2020.01)

(58) Field of Classification Search
CPC ................. G01S 7/5273; G01S 15/931; G01S 2013/9316; G01S 2013/9322; G01S 15/102; B06B 2201/55; B06B 1/0238
See application file for complete search history.

(56) References Cited

U.S. PATENT DOCUMENTS

| | | |
|---|---|---|
| 10,025,272 B2 | 7/2018 | Falter et al. |
| 2012/0120768 A1 | 5/2012 | Horsky et al. |
| 2013/0301391 A1 | 11/2013 | Altman et al. |
| 2018/0052222 A1 | 2/2018 | Zeisler |
| 2018/0123839 A1 | 5/2018 | Chung et al. |
| 2019/0196010 A1* | 6/2019 | Sugae .................. G01S 15/104 |

FOREIGN PATENT DOCUMENTS

| | | | |
|---|---|---|---|
| DE | 102012024959 A1 | 6/2014 | |
| EP | 0 966 131 A2 | 12/1999 | |
| EP | 3502741 A3 * | 8/2019 | ............ G01S 15/04 |
| JP | 4-336714 A | 11/1992 | |
| JP | 2005-249770 A | 9/2005 | |
| JP | 2009-210372 A | 9/2009 | |
| JP | 2011-112416 A | 6/2011 | |
| JP | 2011-145196 A | 7/2011 | |
| JP | 2012-108121 A | 6/2012 | |
| JP | 2014-500492 A | 1/2014 | |
| JP | 2014-142305 A | 8/2014 | |
| JP | 2014-145766 A | 8/2014 | |
| JP | 2015-502534 A | 1/2015 | |
| JP | 2016-17786 A | 2/2016 | |
| JP | 2017-146165 A | 8/2017 | |
| JP | 2017-166864 A | 9/2017 | |
| JP | 2019113359 A * | 7/2019 | |
| WO | 2015/162812 A1 | 10/2015 | |
| WO | 2016/159431 A1 | 10/2016 | |
| WO | 2016177727 A1 | 11/2016 | |

* cited by examiner

OBSTACLE DETECTION SENSOR

CROSS REFERENCE TO RELATED APPLICATIONS

This application is based on and claims priority under 35 U.S.C. § 119 to Japanese Patent Applications 2017-245529, 2017-245530 and 2017-245531, all filed on Dec. 21, 2017, the entire contents of which are incorporated herein by reference.

TECHNICAL FIELD

This disclosure relates to an obstacle detection sensor including a piezoelectric (oscillating) element which oscillates an ultrasonic wave, for example, a TOF type distance sensor.

BACKGROUND DISCUSSION

JP 2005-249770 A (Reference 1) discloses an ultrasonic distance measurement device by a so-called time-of-flight (TOF) method, which measures a distance to a reflecting object by transmitting an ultrasonic wave and receiving a reflected wave of the ultrasonic wave.

The ultrasonic distance measurement device described in this Reference 1 may obtain the distance by transmitting a burst ultrasonic wave to which an identification signal (modulation signal) is added via modulation of, for example, the frequency or phase of a pulse signal, receiving, for example, a reflected wave of the ultrasonic wave including the identification signal as information, and accurately detecting a rising portion of the received reflected wave (received signal) by taking a correlation with the transmitted modulation signal.

JP 2011-112416 A (Reference 2) discloses a vehicle periphery monitoring device, which detects an obstacle existing around a vehicle to which a distance measurement device (ultrasonic sonar) is attached by receiving a reflected wave of an ultrasonic wave transmitted from the ultrasonic sonar. In addition, in such a vehicle periphery monitoring device, there is described a need to improve the performance of detecting the obstacle existing around the vehicle.

On a road on which a vehicle travels, there are a so-called obstacle that interferes with traveling and unevenness on the road surface that does not interfere with traveling (e.g., dents and bulges on the road surface and the presence of gravel and stones).

The ultrasonic distance measurement device described in Reference 1 may accurately obtain the distance by distinguishing the reflected wave of the ultrasonic wave oscillated thereby from other ultrasonic waves according to the presence or absence of the identification signal. However, even if the identification signal is added to the oscillated ultrasonic wave, it may be impossible to identify an obstacle on the road and unevenness on the mad surface based on the identification signal. This is because the identification signal is also included in the reflected wave due to unevenness on the road surface.

Therefore, the need to improve the performance of detecting the obstacle existing around the vehicle as exemplified in Reference 2 has not been sufficiently satisfied by simply accurately obtaining the distance information.

Therefore, it is necessary to provide an obstacle detection sensor capable of performing measurement with high accuracy regardless of the state of the road surface. As described in Reference 1, when the identification signal is added to the ultrasonic wave, the detection accuracy of the rising portion of the received reflected wave is improved. Therefore, it is possible to improve the distance measurement performance of the distance measurement device.

As an improvement in measurement performance, for example, an improvement in discrimination (so-called crosstalk prevention) against an ultrasonic wave of another distance measurement device, or an improvement in measurement performance such as redundancy for reliably detecting the identification signal or enlargement of a measurement area (particularly, a measurement range in short-range measurement) is required. However, when considering, for example, an in-vehicle application, as exemplified in Reference 2, such an improvement is not sufficient in terms of discrimination between the ultrasonic wave oscillated by the distance measurement device and an ultrasonic wave of another distance measurement device. Since many vehicles are traveling on the road, ultrasonic waves from these vehicles as oscillation sources are congested, and therefore there may occur an interference in which an identification signal included in an ultrasonic wave from a host vehicle overlaps a signal included in an ultrasonic wave oscillated from another vehicle.

Therefore, it is necessary to provide a distance measurement device which prevents interference between an identification signal included in an ultrasonic wave from the distance measurement device and a signal included in an ultrasonic wave oscillated by another vehicle.

Thus, a need exists for an obstacle detection sensor and a distance measurement device which are not susceptible to the drawback mentioned above.

SUMMARY

A feature of an obstacle detection sensor according to an aspect of this disclosure resides in that the obstacle detection sensor includes a controller configured to determine a detection condition of an obstacle on a road, a distance sensor unit configured to acquire distance information by oscillating a vibration wave and receiving a reflected wave of the oscillated vibration wave, a communication unit configured to communicate with an outside to acquire road surface information, and a storage unit configured to store detection relationship information for identifying the obstacle based on the distance information, wherein the controller compares the detection relationship information read from the storage unit with the distance information and the road surface information acquired from the distance sensor unit and the communication unit to determine the detection condition.

A feature of a distance measurement device according to another aspect of this disclosure resides that the distance measurement device includes an oscillator configured to oscillate a carrier wave, a pulse generator configured to output a unique code as a pulse signal, a modulator configured to modulate the carrier wave and output a modulated wave corresponding to the pulse signal, a piezoelectric element configured to oscillate and receive an ultrasonic wave corresponding to the modulated wave, and a controller configured to calculate a distance based on the code obtained by demodulating a reflected wave of the ultrasonic wave received by the piezoelectric element, wherein the modulator modulates the carrier wave using a plurality of modulation schemes at the same time.

A feature of a distance measurement device according to still another aspect of this disclosure resides in that the distance measurement device includes an oscillator configured to oscillate a carrier wave, a modulator configured to output a modulated wave obtained by adding an identification signal to the carrier wave by a predetermined scheme, an osculation element configured to oscillate an ultrasonic wave corresponding to the modulated wave, a receiving element configured to receive the ultrasonic wave, a demodulation unit configured to demodulate the ultrasonic wave received by the receiving element to acquire a demodulated signal, and a controller configured to determine a scheme of the demodulated ultrasonic wave, in which the controller causes the receiving element to receive the ultrasonic wave beforehand when the modulator outputs the modulated wave, causes the demodulation unit to demodulate the received ultrasonic wave to acquire a demodulated signal, and determines a scheme of the demodulated signal to output information about the scheme to the modulator, and the modulator adds the identification signal to the carrier wave by a scheme different from the scheme of the demodulated signal based on the information and outputs the modulated wave.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A distance measurement device 100 used as an obstacle detection sensor according to an embodiment disclosed here will be described with reference to FIGS. 1 to 16.

Outlined Description

Figure 1:
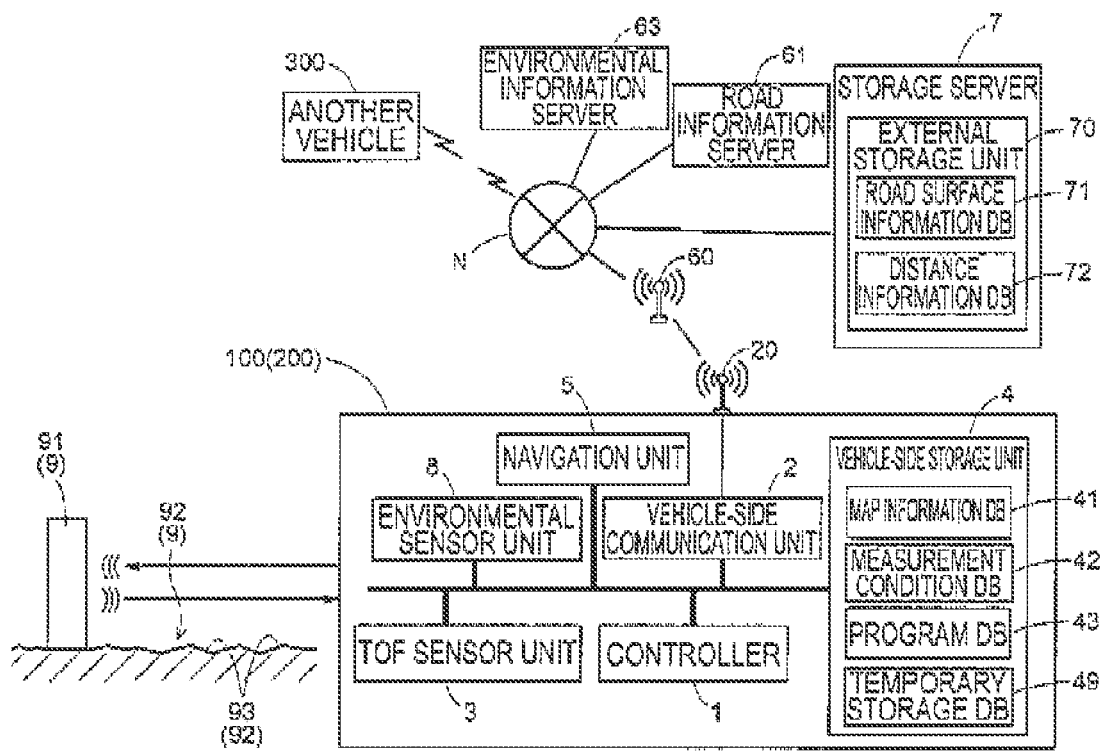
FIG. 1 is an explanatory view of a configuration of a distance measurement device.

FIG. 1 is a schematic view explaining a schematic configuration of a vehicle 200 in which the distance measurement device 100 is mounted.

The distance measurement device 100 is a distance measurement device that measures a distance to an object 9 by receiving a reflected wave of a modulated ultrasonic wave and acquires distance information.

In the present embodiment, the distance measurement device 100 functions as an obstacle detection sensor that is capable of distinguishing an obstacle 91 from unevenness 93 on a road 92 by measuring the distance to the object 9. For example, the distance measurement device 100 is mounted in the vehicle 200 to recognize the presence of the obstacle 91 and grasp the distance to the obstacle 91, so that a controller 1 notifies a driver of such information via, for example, a display unit (not illustrated) on a driver's seat of the vehicle 200.

As illustrated in FIG. 1, the distance measurement device 100 includes, as major components, for example, a TOF sensor unit 3 (an example of a distance sensor unit), a vehicle-side communication unit 2 (an example of a communication unit) which communicates with the Internet N which is an external network, a vehicle-side storage unit 4 (an example of a storage unit) which stores therein detection relationship information for identifying the object 9, and the controller 1 which controls operations of the distance measurement device 100 and the vehicle 200.

Hereinafter, another configuration will also be described with reference to FIG. 13.

The distance measurement device 100 includes the controller 1 which controls an operation of the entire device and performs calculation of a distance, a probe having a piezoelectric element 312 (an example of a receiving element and an oscillation element) which oscillates an ultrasonic wave, and an oscillator 412 which oscillates a fundamental wave of the ultrasonic wave which is oscillated by the piezoelectric element 312.

In addition, the distance measurement device 100 includes, as major functional units, for example, a modulator 212 which modulates the fundamental wave (carrier wave) oscillated by the oscillator 412 and a wave detector 512 which demodulates a reflected wave received by the piezoelectric element 312 to acquire a demodulated signal.

In the present embodiment, at least a storage seater 7, a road information server 61, and an environmental information server 63 are connected to the Internet N which is an external network from the viewpoint of the vehicle 200.

Detailed Description

As for Internet and Cloud Computing

The Internet N is a network through which the vehicle 200 may communicate with various servers or another vehicle 300 via a public communication antenna 60. The public communication antenna 60 is, for example, a base station of a mobile phone network.

At least the storage server 7, the road information server 61, and the environmental information server 63 are connected to the Internet N, and each server may independently communicate with, for example, another server or the vehicle 200.

The road information server 61 is a server that manages information about the road surface (road surface information) of a road on which the vehicle 200 or the other vehicle 300 is supposed to travel or distance information acquired by the vehicle 200 or the other vehicle 300, and includes a program storage unit and a central processing unit (not illustrated) for the operation and analysis of information.

In the present embodiment, the road information server 61 does not locally include a storage unit which stores therein the road surface information or the distance information, and uses, as a storage unit, the storage server 7 having a storage device such as, for example, a hard disk (hereinafter referred to as an "external storage unit 70"). In the present embodiment, the road information server 61 includes a road surface information DB 71 which stores the road surface information and a distance information DB 72 in the external storage unit 70 of the storage server 7. That is, the road information server 61 includes the road surface information DB 71 and the distance information DB 72 in the storage server 7 which is configured as a cloud storage.

The road information server 61 or the storage server 7 is configured as a so-called cloud, for example, in such a manner that a plurality of electronic computers connected to the Internet N virtually function as one server or that multiple kinds of virtual servers are built on one electronic computer to exert functions thereof.

Information about unevenness on the road is stored in the distance information DB 72. For example, distance information transmitted from the vehicle 200 or the other vehicle 300 is stored in the distance information DB 72.

The road surface information is stored in the road surface information DB 71. The stored road surface information is information (road surface information) obtained by analyzing a large amount of distance information (so-called big data) stored in the distance information DB 72 and classifying the states of respective roads via the cloud, for example, by the central processing unit of the road information server 61.

For example, the road surface information indicating that a certain road is a well-caved road, a damaged paved road, a gravel road, or an unpaved road, for example, is classified and stored in the road surface information DE 71. A detailed description will be given later.

In addition, the road surface information is not limited to the above example, and may include information indicating that a material of the road surface of the road is asphalt or concrete, for example, or other minutely classified information indicating the temperature or the state of the road surface such as, for example, that the state of the road surface is a freezing temperature or lower, icy, or wet.

The environmental information server 63 is a server that manages weather information around the road on which the vehicle 200 or the other vehicle 300 is supposed to travel, and transfers the weather information in response to a request from the vehicle 200 or the like.

The environmental information server 63 is capable of transferring at least an environmental value such as, for example, temperature or humidity information among the weather information to the vehicle 200 or the like. In the present embodiment, the environmental information server 63 is capable of transferring atmospheric pressure information as the environmental value, in addition to the temperature or humidity information.

Although not illustrated, similarly to the road information server 61, the environmental information server 63 also uses the storage server 7 as a storage unit that stores therein the weather information.

Configuration of TOF Sensor (Distance Measurement Device)

Figure 2:
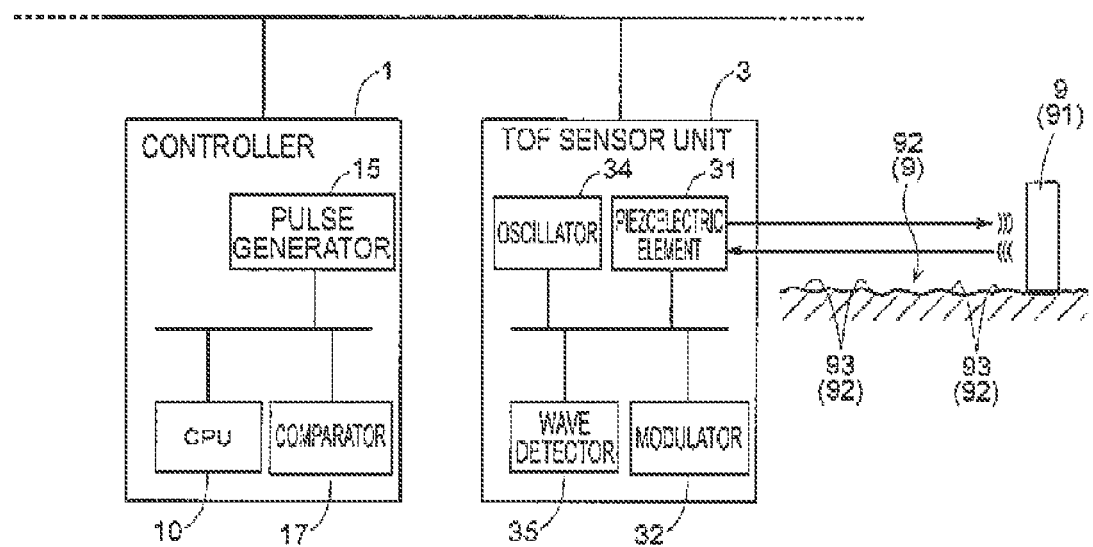
FIG. 2 is an explanatory view of a configuration of a controller and a TOF sensor unit.

As illustrated in FIG. 2, the TOF sensor unit 3 includes a piezoelectric element 31 which oscillates an ultrasonic wave, an oscillator 34 which oscillates a fundamental wave of the ultrasonic wave which is oscillated by the piezoelectric element 31, a modulator 32 which modulates the fundamental wave (carrier wave) oscillated by the oscillator 34, and a wave detector 35 which demodulates a reflected wave received by the piezoelectric element 31 to acquire a demodulated signal. The TOF sensor unit 3 is a sensor unit for executing a so-called time-of-flight (TOF) scheme of transmitting an ultrasonic wave from the piezoelectric element 31 end receiving a reflected wave of the ultrasonic wave by the piezoelectric element 31 to measure a distance to a reflecting object The piezoelectric element 31 is a device that oscillates and receives an ultrasonic wave.

The piezoelectric element 31 is a so-called ultrasonic transducer unit (probe) (FIG. 13) having a vibrator (not illustrated) which is displaced according to a voltage applied thereto and generates an electromotive force according to the displacement when a mechanical force such as, for example, vibration energy is applied thereto.

Since the vibrator of the piezoelectric element 31 resonates at a predetermined frequency (wavelength), usually, the center frequency (or wavelength) of an oscillating ultrasonic wave and the center frequency (or wavelength) of an ultrasonic wave that may be received become the same.

The resonance frequency of the piezoelectric element 31 of the present embodiment is 40 kHz.

In the present embodiment, the piezoelectric element 31 oscillates an ultrasonic wave according to a change in the voltage (modulated wave) applied from the modulator 32. In addition, the piezoelectric element 31 may receive an external vibration, for example, the ultrasonic wave oscillated by the piezoelectric element 31.

Figure 12:
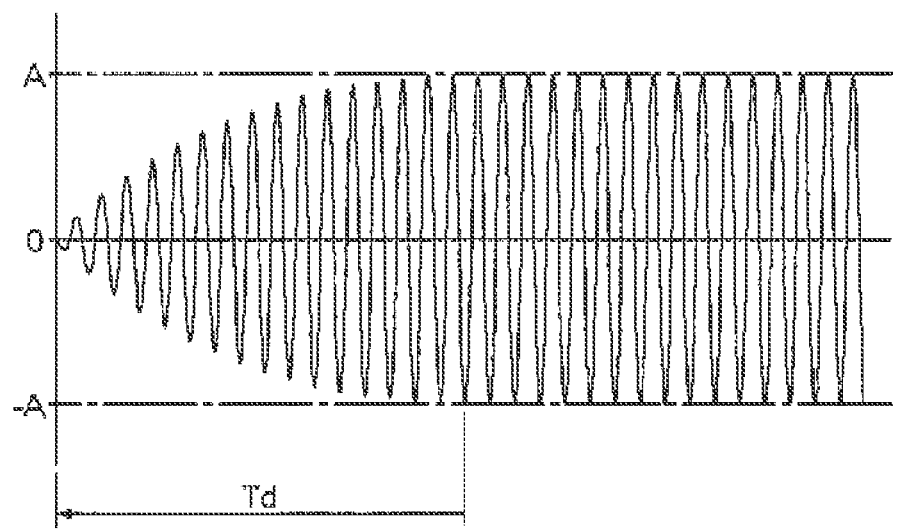
FIG. 12 is a view illustrating an example of a vibration waveform.

A piezoelectric element 311 used in another embodiment 1 (FIG. 11) becomes a normal state where it reaches a constant amplitude A after vibrating multiple times, i.e., after a predetermined delay time Td, as illustrated in FIG. 12, when constant energy which changes under a predetermined (constant) condition (in the present embodiment, a voltage having a constant amplitude which changes at a frequency corresponding to the natural frequency of the piezoelectric element 311) is constantly applied from a modulator 211.

Therefore, when it is desired to obtain a large amplitude using the piezoelectric element 311, a large delay time Td is required. On the other hand, when it is desired to obtain a relatively small amplitude using the piezoelectric element 311, the delay time Td is reduced.

In the present embodiment, the piezoelectric element 31 repeats a continuous vibration (vibration under the application of a voltage) for a predetermined time and a stop. The piezoelectric element 31 may receive an external vibration (ultrasonic wave) while the vibration stops. In other words, the application of a voltage stops when receiving the external vibration.

The vibration received by the piezoelectric element 31 is converted into a voltage signal by the piezoelectric element 31 and is transmitted to the wave detector 35.

That is, in the present embodiment, one ultrasonic transducer unit is used as the piezoelectric element 31, and the piezoelectric element 31 is used as an oscillation element when oscillating an ultrasonic wave corresponding to a modulated wave. The same piezoelectric element 31 is also used as a receiving element when receiving a surrounding ultrasonic wave.

The oscillator 34 is a frequency generator that oscillates a fundamental wave for vibrating the piezoelectric element 31. In the present embodiment, the fundamental wave oscillated by the oscillator 34 is used as a carrier wave.

In the present embodiment, the oscillator 34 generates a predetermined frequency based on the fundamental vibration of a quartz oscillator (not illustrated) which vibrates at a predetermined frequency, and supplies, as a carrier wave, the predetermined frequency to the modulator 32. In addition, in another embodiment 1 (FIG. 11), the predetermined frequency is supplied to a wave detector 511 as a fundamental wave for demodulation.

The modulator 32 includes a circuit (not illustrated) for generation of a voltage for driving the piezoelectric element 31 as a modulation circuit (not illustrated) which modulates the fundamental wave (hereinafter sometimes simply referred to as "modulates") oscillated by the oscillator 34 and transmits a modulated wave to the piezoelectric element 31.

In the present embodiment, the modulator 32 modulates the fundamental wave oscillated by the oscillator 34 as a carrier wave in response to a signal oscillated by a pulse generator 15, and generates a modulated wave including signal information. Then, the modulator 32 drives the piezoelectric element 31 by applying the modulated wave as a voltage, i.e., a voltage which is changed in the strength of a phase or amplitude, to the piezoelectric element 31. The piezoelectric element 31 vibrates according to the voltage applied from the modulator 32, and oscillates the modulated ultrasonic wave, i.e., an ultrasonic wave including signal information.

The modulator 32 may modulate by a scheme in response to an instruction from the controller 1.

In the present embodiment, the modulator 32 oscillates the modulated wave using any one of a phase modulation scheme, an amplitude modulation scheme, and a frequency modulation scheme, or a combination thereof in response to an instruction from the controller 1.

The modulator 32 includes therein a modulation circuit (not illustrated) corresponding to the phase modulation scheme, the amplitude modulation scheme, the frequency modulation scheme, or a combination thereof. In another embodiment 1 (FIG. 11), the modulator 211 may perform modulation using a plurality of modulation schemes in a switching manner as switching between a plurality of modulation protocols.

The modulator 211 may use at least the phase modulation scheme, the amplitude modulation scheme, and the frequency modulation scheme as the plurality of modulation schemes in a switching manner.

The modulator 211 may modulate using a plurality of modulation schemes at the same time (in combination or overlapped manner).

In another embodiment 1 (FIG. 11), the modulator 211 may modulate using at least two modulation schemes at the same time among the phase modulation scheme, the amplitude modulation scheme, and the frequency modulation scheme.

In addition, the phase modulation scheme referred to in the present embodiment refers to a scheme of modulating a digital signal by changing and representing the phase of a carrier wave, i.e., a scheme of modulating and transmitting a phase, and is also called "phase shift keying (PSK)."

Figure 3:
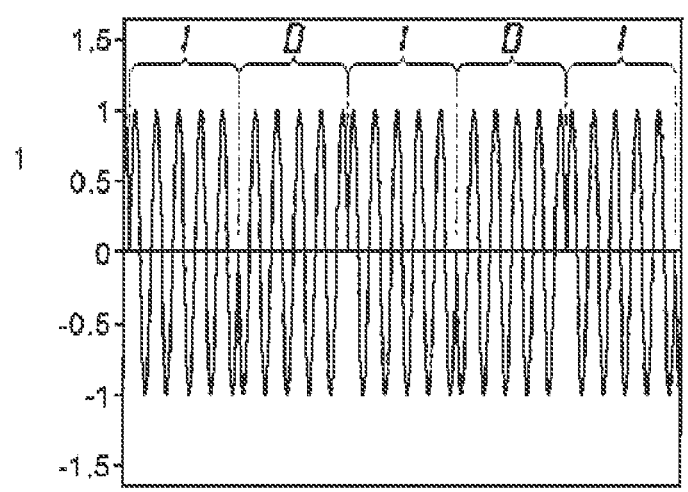
FIG. 3 is an explanatory view of a waveform modulated by a phase modulation scheme.

FIG. 3 illustrates an example of a waveform modulated by the phase modulation scheme.

In the present embodiment, as illustrated in FIG. 3, the same phase as the carrier wave represents "1" in binary number, and the phase shifted from the carrier wave by $\pi$ represents "0" in binary number.

In addition, the amplitude modulation scheme referred to in the present embodiment refers to a scheme of modulating a digital signal by representing a difference in the amplitude of a carrier wave, a scheme of modulating an amplitude, and is also called "amplitude shift keying (ASK)."

In the present embodiment, among consecutive waves, a relatively large amplitude represents "1" in binary number, and a relatively small amplitude represents "0" in binary number.

Figure 4:
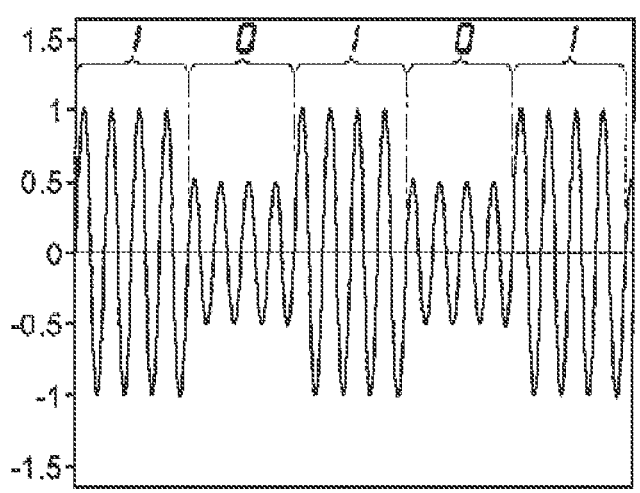
FIG. 4 is an explanatory view of a waveform modulated by an amplitude modulation scheme.

FIG. 4 illustrates an example of a waveform modulated by the amplitude modulation scheme.

FIG. 4 illustrates a case where, for a relatively large amplitude representing "1" in binary number, when the amplitude is assumed to be 100%, modulation of an amplitude of 50% is controlled as a target amplitude in a case of representing "0" in binary number, and an amplitude equal to or less than 75% which is the average value of 100% and 50% is assumed to represent "0" in binary number.

In addition, the frequency modulation scheme referred to in the present embodiment refers to a scheme of modulating a digital signal by representing a difference in the frequency of a carrier wave, i.e., a scheme of modulating a frequency, and is also called "frequency shift keying (FSK)."

Figure 5:
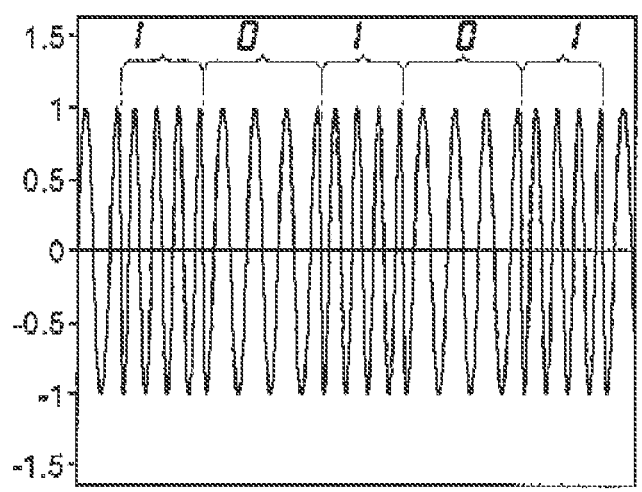
FIG. 5 is an explanatory view of a waveform modulated by a frequency modulation scheme.

FIG. 5 illustrates an example of a waveform modulated by the frequency modulation scheme.

In the present embodiment, the same frequency as the carrier wave may represent "1" in binary number, and the frequency changed by a predetermined magnitude from the carrier wave may represent "0" in binary number. For example, in a case or FIG. 5, the same frequency as the carrier wave represents "1" in binary number, and the frequency smaller than the carrier wave by a predetermined magnitude represents "0" in binary number.

In the present embodiment, hereinafter, a case where the modulator 32 modulates using two modulation schemes including the phase modulation scheme and the amplitude modulation scheme at the same time to output a modulated wave and the piezoelectric element 31 oscillates an ultrasonic wave corresponding to a modulated wave will be described by way of example.

Figure 6:
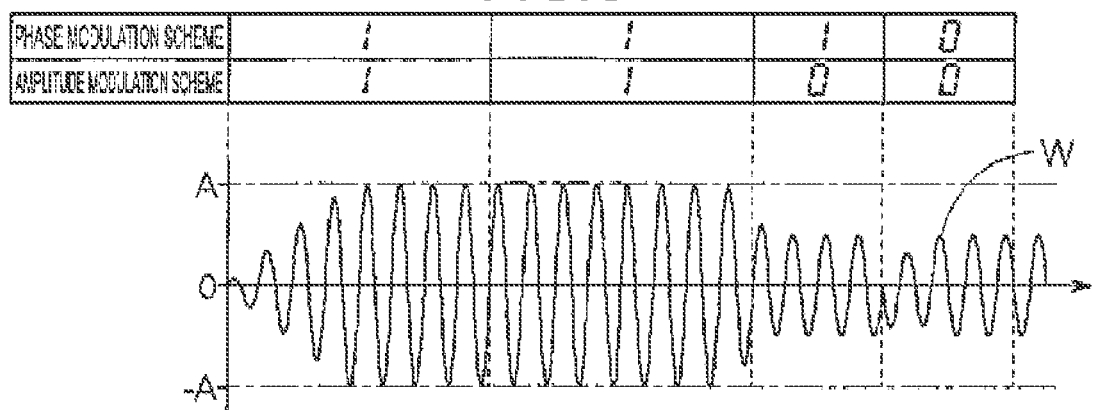
FIG. 6 is an explanatory view of a waveform modulated using a phase modulation scheme and an amplitude modulation scheme at the same time.

A waveform W in FIG. 6 illustrates an example of the waveform of an ultrasonic wave in a case where the piezoelectric element 31 oscillates the ultrasonic wave modulated using the phase modulation scheme and the amplitude modulation scheme at the same time.

In a case of FIG. 6, the pulse generator 15 transmits a pulse signal (illustrated in the upper table of FIG. 6) including an 8-bit code of [11111000] in order from the most significant bit. Then, the modulator 32 modulates and represents each bit using the amplitude modulation scheme and the phase modulation scheme alternately in order from the high-order bit to the low-order bit. In addition, the piezoelectric element 31 (see FIG. 1) oscillates an ultrasonic wave of the waveform W as an ultrasonic wave corresponding to the modulated wave.

In addition, FIG. 6 illustrates a case where the modulator 32 modulates the burst length of a portion representing "0" by the amplitude modulation scheme into a burst length that is half that of a portion representing "1" by the amplitude modulation scheme.

The wave detector 35 illustrated in FIG. 2 is a functional unit having a demodulation function for demodulating a vibration received by the piezoelectric element 31 to obtain a demodulated signal. In addition, in the present embodiment, the vibration received by the piezoelectric element 31 is an ultrasonic wave, particularly a reflected wave of the ultrasonic wave oscillated by the piezoelectric element 31.

In the present embodiment, the wave detector 35 has a demodulation circuit that functions as a demodulation unit corresponding to the phase modulation scheme, the amplitude modulation scheme, and the frequency modulation scheme.

The wave detector 35 transmits the demodulated signal to a comparator 17 of the controller 1. When receiving the demodulated signal, the controller 1 determines a scheme of the demodulated signal, and also recognizes a signal included in the demodulated signal.

In another embodiment (FIG. 11), the wave detector 511 demodulates the ultrasonic wave received by the piezoelectric element 311 based on a fundamental wave supplied from the oscillator 411. In principle, the wave detector 511 performs, as demodulation, a reverse operation to the modulation performed by the modulator 2.

Configuration of Vehicle-Side Communication Unit

As illustrated in FIG. 1, the vehicle-side communication unit 2 is a functional unit for allowing the vehicle 200 and the distance measurement device 100 to communicate with an external network. In the present embodiment, the vehicle-side communication unit 2 is connected to the Internet N via an in-vehicle antenna 20 and the so-called public communication antenna 60 connected to the Internet N. The vehicle-side communication unit 2 may communicate, via the Internet N, with the road information server 61 or the environmental information server 63 which is connected to the Internet N.

Configuration of Storage Unit

As illustrated in FIG. 1, the vehicle-side storage unit 4 is a storage device for storing and reading various kinds of information used by the vehicle 200 and the distance measurement device 100.

In the present embodiment, the vehicle-side storage unit 4 includes a map information DB 41 which stores therein information on a road network on which the vehicle 200 is supposed to travel, a measurement condition DB 42 which stores therein detection relationship information for allowing the controller 1 to detect the obstacle 91 from information on the distance to the object 9, a temporary storage DB 49 which temporarily stores therein the road surface information acquired from the road information server 61 or the distance information acquired by the TOF sensor unit 3, and a program DB which stores therein a basic program for allowing the controller 1 to execute various operations.

Information on a road map that may specify the road 90 from at least the latitude and the longitude is recorded in the map information DB 41.

The detection relationship information for identifying the obstacle 91 and the unevenness 93 on the road 92 based on the distance information is stored according to the state of the road surface in the measurement condition DB 42. For example, it is possible to store detection relationship information corresponding to each case where a certain road 90 is a well-paved road, a damaged paved road, a gravel road, or an unpaved road.

Configuration of Controller

As illustrated in FIG. 1, the controller 1 is an engine control unit (ECU) of the vehicle 200, and in the present embodiment, has a function of controlling the entire distance measurement device 100.

As illustrated in FIG. 2, the controller 1 includes a CPU 10 which is a central processing unit as a core mechanism. The controller 1 further includes the pulse generator 15 and the comparator 17. In addition, in another embodiment 2 (FIG. 13), the controller 1 includes a storage unit 19 in which an operation program of the controller 1 is stored.

Figure 13:
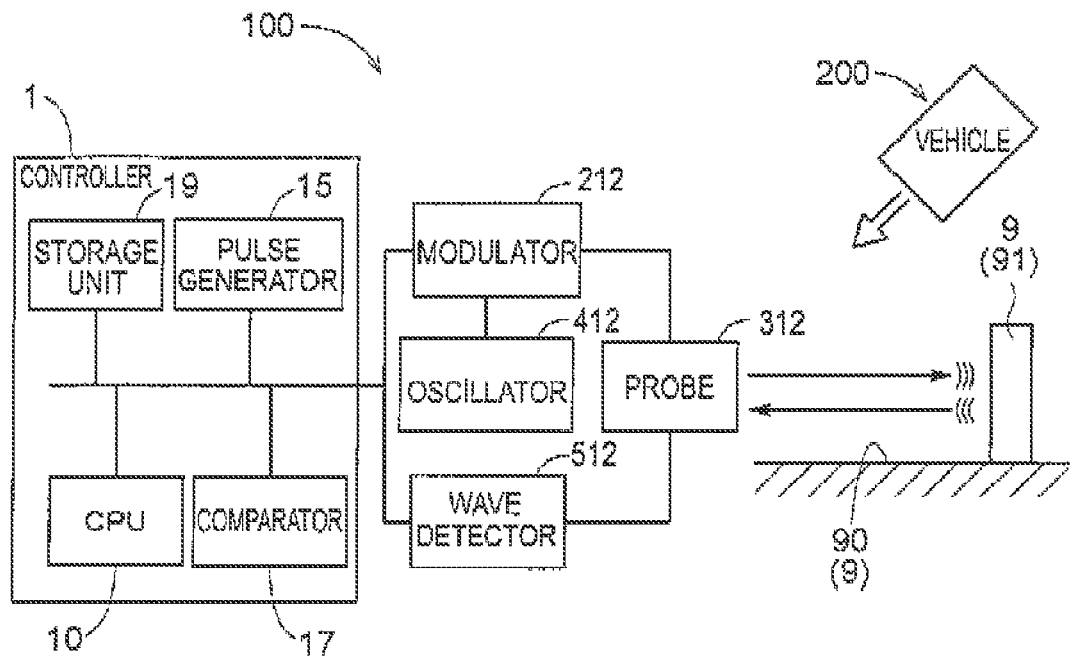
FIG. 13 is an explanatory view of a configuration of a distance measurement device.

The CPU 10 is a functional unit that executes a function other then those of the pulse generator 15 and the comparator 17 in the controller 1, and is an operation unit that operates according to the program stored in the storage unit 19 (FIG. 13).

The pulse generator 15 is a signal generator that generates a signal including a predetermined code. The pulse generator 15 generates, as an identification signal, a signal including a predetermined unique code (a unique code string or a code string to be an identification ID) in the distance measurement device 100.

In the present embodiment, the pulse generator 15 supplies (transmits) the generated identification signal to the modulator 32 as the controller 1.

The pulse generator 15 operates to generate the signal including the predetermined code in response to an operation command transmitted from the CPU 10.

The pulse generator 15 generates a signal including a binary number code of a predetermined bit array with a predetermined bit length.

As the predetermined bit length, for example, a bit length of 8 bits may be selected.

An arbitrary array may be selected as the predetermined bit array.

The pulse generator 15 outputs each bit in the predetermined bit length as a pulse signal (pulse ON/OFF). When the pulse generator 15 emits a pulse at a predetermined timing (pulse ON), the pulse at the predetermined timing means "1" in binary number, and when the pulse generator 15 does not emit a pulse at a predetermined timing (pulse OFF), the predetermined timing means "0" in binary number.

The pulse generator 15 outputs a signal as a combination of pulse ON/OFF of 8 times when the bit length is bits.

Hereinafter, a state where the pulse generator 15 emits a pulse at a predetermined timing is set to a code 1. In addition, a state where the pulse generator 15 does not emit a pulse at a predetermined timing is set to a code 0.

In addition, when simply referred to as a pulse, this means either the code 1 or the code 0.

In addition, when referred to as a pulse signal, this means a combination of a plurality of pulses.

In addition, the predetermined timing at which the pulse generator 15 emits a pulse may be synchronized with, for example, the timing (e.g., cycle) of the fundamental wave oscillated by the oscillator 34.

In the present embodiment, the predetermined timing is synchronized with the cycle of the fundamental wave oscillated by the oscillator 34. Specifically, in principle, the pulse generator emits one pulse at each timing (eight cycles) at which eight waves are oscillated.

The comparator 17 is an operation unit for comparing a code included in the signal (demodulated signal) acquired from the wave detector 35 of the TOF sensor unit 3 with a code of the pulse generator 15 and determining match or mismatch therebetween.

The comparator 17 transmits the determined result (hereinafter referred to as a "determination result") to the CPU 10.

The CPU 10 is a functional unit that executes a function other than those of the pulse. generator 15 and the comparator 17 in the controller 1, and is an operation unit that operates according to a program stored in the program DB 43 (see FIG. 1) of the vehicle-side storage unit 4.

As the controller 1, the CPU 10 calculates the distance to the object 9 based on the determination result obtained from the comparator 17 and the timing at which the determination result is acquired.

In addition, as the controller 1, the CPU 10 may determine a detection condition of the obstacle 91 on the road that is currently being measured by comparing the detection relationship information recorded in advance in the measurement condition DB 42 with the road surface information on the road that is currently being measured, acquired from the road surface information DB 71 via the road information server 61, and the distance information acquired by the TOF sensor unit 3 to detect the obstacle 91.

In addition, in another embodiment 1 (FIG. 11), as the controller 1, the CPU 10 further instructs a modulation protocol to the modulator 211 under a predetermined condition.

The modulation protocol in another embodiment 1 (FIG. 11) means the frequency of an ultrasonic wave, a so-called modulation scheme, the setting of the burst length of a burst wave corresponding to each pulse generated by the pulse generator 15, information on the code generated by the pulse generator 15, or the like. As the controller 1, the CPU 10 is capable of instructing the modulation protocol such as, for example, the modulation scheme or the setting of the burst length to the modulator 211.

Hereinafter, a case where the modulate 211 performs modulation using two modulation schemes including the phase modulation scheme and the amplitude modulation scheme at the same time will be described by way of example.

The modulator 211 may modulate the burst length of a burst wave corresponding to each pulse generated by the pulse generator 15 as switching between a plurality of modulation protocols in a switching manner.

That is, in the present embodiment, when representing "0" by the amplitude modulation scheme, a relatively small amplitude is obtained by shortening the burst length.

In another embodiment 2 (FIG. 13), the modulator 212 includes a circuit (not illustrated) which generates a voltage for driving the piezoelectric element 312 as a modulation circuit (not illustrated) which modulates a fundamental wave (hereinafter sometimes referred to simply as "modulates") oscillated by the oscillator 412 and transmits a modulated wave to the piezoelectric element 312.

In another embodiment 2, the modulator 212 modulates the fundamental wave oscillated by the oscillator 412 as a carrier wave in response to a signal oscillated by the pulse generator 15, and generates a modulated wave including signal information.

Then, the modulator 212 drives the piezoelectric element 312 by applying the modulated wave as a voltage wave, i.e., a voltage which is changed in the strength of a phase or amplitude, to the piezoelectric element 312. The piezoelectric element 312 vibrates according to the voltage applied from the modulator 212, and oscillates the modulated ultrasonic wave, i.e., an ultrasonic wave including signal information.

The modulator 212 may output a modulated wave to which an identification signal which is a predetermined unique code is added by a predetermined scheme.

Here, the predetermined scheme refers to a modulation protocol.

In the present embodiment, the modulator 212 may modulate using a plurality of modulation protocols in a switching manner or in combination thereof in response to an instruction from the controller 1.

The modulator 212 may modulate a plurality of modulation schemes in a switching manner as switching between the plurality of modulation protocols.

The modulator 212 may use at least the phase modulation scheme, the amplitude modulation scheme, and the frequency modulation scheme as the plurality of modulation schemes in a switching manner.

In addition, the modulator 212 may modulate using the plurality of modulation schemes at the same time (in combination or overlapped manner).

The modulator 212 may modulate the burst length of a burst wave corresponding to each pulse generated by the pulse generator 15 using the plurality of modulation protocols in a switching manner.

That is, in the present embodiment, when representing "0" by the amplitude modulation scheme, a relatively small amplitude is obtained by shortening the burst length.

Figure 14:
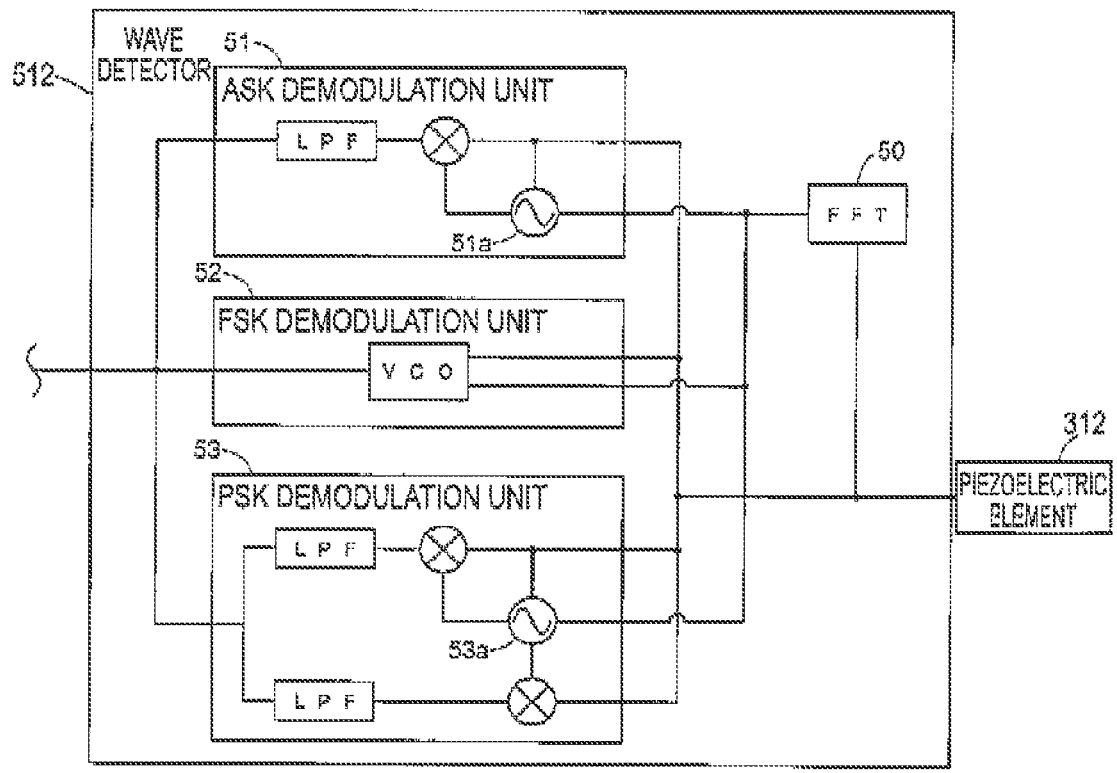
FIG. 14 is an explanatory view of a configuration of a wave detector.

The wave detector 512 illustrated in FIGS. 13 and 14 is a functional unit having a demodulation function for demodulating a vibration received by the piezoelectric element 312 to acquire a demodulated signal. In addition, in the present embodiment, the vibration received by the piezoelectric element 312 is an ultrasonic wave, particularly a reflected wave of an ultrasonic wave oscillated by the piezoelectric element 312.

In another embodiment 2, as illustrated in FIG. 14, the wave detector 512 includes an ASK demodulation unit 51, an FSK demodulation unit 52, and a PSK demodulation unit 53 as demodulation circuits which function as demodulation units corresponding respectively to at least the phase modulation scheme, the amplitude modulation scheme, and the frequency modulation scheme.

In addition, the wave detector 512 includes a so-called FFT circuit 50 for analyzing the frequency of an ultrasonic wave received by the piezoelectric element 312. Information on the frequency analyzed by the FFT circuit 50 is transmitted to each of the ASK demodulation unit 51, the FSK demodulation unit 52, and the PSK demodulation unit 53. In addition, "FFT" refers to Fast Fourier Transform.

The ASK demodulation unit 51 and the PSK demodulation unit 53 respectively include a frequency oscillator 51a and a frequency oscillator 53a which are independent of each other, and oscillate an arbitrary frequency required for demodulation according to the information on the frequency received from the FFT circuit 50.

The ASK demodulation unit 51, the FSK demodulation unit 52, and the PSK demodulation unit 53 transmit the demodulated signal from the wave detector 512 to the comparator 17. When receiving the demodulated signal, the controller 1 determines a scheme of the demodulated signal, and also recognizes a signal included in the demodulated signal.

As a detection condition, for example, when a reflected wave having a peak exceeding a predetermined threshold is received, the reflected wave may be defined as a reflected wave from the obstacle 91.

Then, for example, a predetermined threshold in a case of an unpaved road may be set to be greater than a predetermined threshold in a case of a well-paved road.

The reception of the reflected wave, distance measurement, and detection of the obstacle 91 will be described later.

In addition, in the present embodiment, the road that is currently being measured (the current traveling road) may be specified, for example, when the controller 1 acquires, from a navigation unit 5 which is a car navigation device having a so-called global positioning system (GPS). GPS information including information on the latitude and the longitude which may be acquired by the navigation unit 5, and reads the map information stored in the map intonation DB 41 to compare the GPS information with the map information.

Description of Operation

Basic Description of Obstacle Detection Operation

Hereinafter, an operation of detecting the obstacle 91 and measuring the distance to the obstacle 91 by the distance measurement device 100 will be described.

In the present embodiment, the distance measurement device 100 measures the distance by a so-called time-of-flight (TOF) method.

Figure 7:
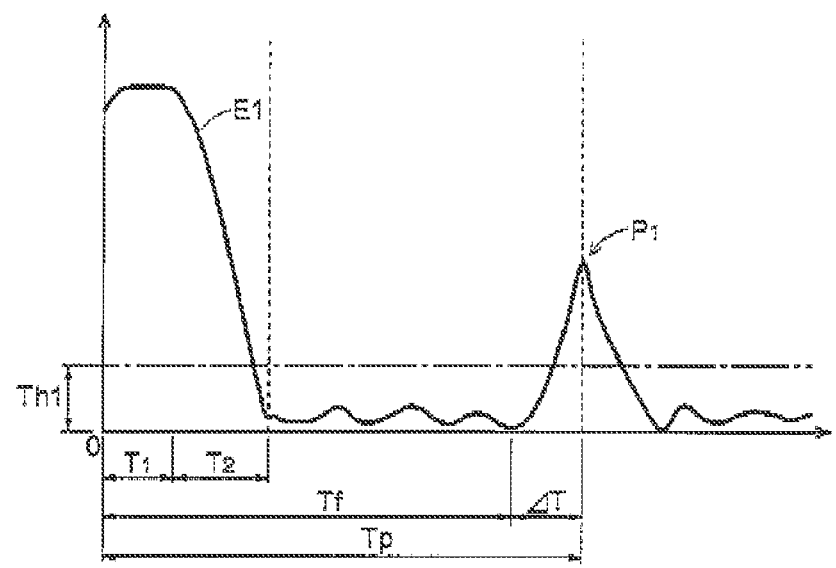
FIG. 7 is an explanatory view of distance measurement by a TOF method.

FIG. 7 is a graph explaining a basic concept of distance information and distance measurement based on the distance information by the TOF method.

The horizontal axis of the graph of FIG. 7 represents the passage of a time.

The vertical axis of the graph of FIG. 7 represents the magnitude of an amplitude.

The line E1 is an envelope of the amplitude of a vibration of the piezoelectric element 31 and is an example of distance information in the present embodiment.

In the present embodiment, the piezoelectric element 31 oscillates a modulated ultrasonic wave as described above.

A specific example of oscillation of the modulated ultrasonic wave will be described later.

The piezoelectric element 31 is driven for an oscillator time T1 by the modulator 32 at a predetermined interval.

FIG. 7 illustrates a case where, after the piezoelectric element 51 is driven only for the oscillation time T1 by the modulator 32 to vibrate (forcibly vibrate), a vibration due to inertia is continued for a reverberation time T2 (so-called reverberation), and then a vibration is received from the outside.

In a case of the illustration of FIG. 7, the piezoelectric element 31 receives a vibration peak P1 having a magnitude exceeding a predetermined threshold Th1 after a time Tp since driving of the piezoelectric element 31 has been started. This vibration peak P1 is usually the peak of a reflected wave from the obstacle 91 (see FIG. 1).

In addition, the threshold Th1 is a value for distinguishing a small reflected wave from the road 90 due to unevenness on the road from the reflected wave from the obstacle 91. The threshold Th1 is an example of detection relationship information in a case where the road 90 is a well-paved road, and in the present embodiment, is a value that is stored in advance in the measurement condition DB 42.

In the present embodiment, a reflected wave having a peak exceeding the threshold Th1 is defined as a reflected wave from the obstacle 91. On the other hand, a reflected wave having a peak not exceeding the threshold Th1 is defined as a reflected wave that is generally caused by unevenness on the road 90.

When the distance to the obstacle 91 is measured by the TOF method, the start point of the vibration peak P1 may be recognized as the start point of receiving the reflected wave.

In FIG. 7, the start point of the vibration peak P1 is illustrated as a point which is traced bock from the time Tp by the time ΔT. Normally, the length of time ΔT is equal to the oscillation time T1. In other words, the time Tf required for receiving the reflected wave of the ultrasonic wave oscillated by the piezoelectric element 31 may be obtained by subtracting the oscillation time T1 from the time Tp.

For example, in a case of FIG. 7, the time Tf corresponds to the time from the point in time 0 at which the driving of the piezoelectric element 31 is started to the point in time that is traced back by the time ΔT from the point in time at which the time Tp representing the vibration peak P1 has passed. Alternatively, the time from the point in time at which the oscillation time T1 has passed to the point in time at which the time Tp representing the oscillation peak P1 has passed has the same time length as the time Tf.

Thus, in this embodiment, the line E1 (the envelope of the amplitude of the vibration of the piezoelectric element 3) is an example of distance information. In the present embodiment the line E1 is stored in the temporary storage DB 49 by the controller 1 as numeric data acquired from the amplitude of the vibration of the piezoelectric element 31.

The reflected wave received by the piezoelectric element 31 is demodulated by the wave detector 35, and an extracted demodulated signal is transmitted to the comparator 17 of the controller 1.

Here, the reflected wave of the ultrasonic wave oscillated by the piezoelectric element 31 has information including a predetermined code. Thus, the signal demodulated and extracted by the wave detector 35 includes a predetermined code generated by the pulse generator 15. Thus, when the determination result of the comparator 17 matches, the controller 1 may recognize the reflected wave of the ultrasonic wave oscillated by the piezoelectric element 31 and detect the presence of the obstacle 91. Then, the controller 1 may obtain the time Tf, and may obtain the distance to the obstacle 91 by multiplying half the time Tf by the sonic speed.

In addition, here, since the sonic speed varies depending on, for example, the temperature, humidity, or atmospheric pressure around the vehicle 200, in the present embodiment, the controller 1 may accurately obtain the sonic speed under an environment in which the vehicle 200 is traveling based on an environmental value which is information on the environment such as, for example, the temperature, humidity, or atmospheric pressure acquired by the environmental sensor unit 8 of the vehicle 200. Therefore, the controller 1 may acquire accurate distance information in which fluctuation of the environmental value is corrected.

In addition, in a case where the environmental sensor unit 8 has a fault and cannot acquire the environmental value, the controller 1 causes the vehicle-side communication unit 2 to communicate with the environmental information server 63 to acquire a surrounding environmental value from the environmental information server 63 so as to accurately obtain the sonic speed under the environment in which the vehicle 200 is traveling. Therefore, even when a fault occurs in the environmental sensor unit 8, the controller 1 may acquire accurate distance information in which fluctuation of the environmental value is corrected.

Avoidance of Erroneous Detection

A supplementary description will be made for a case where the determination result of the comparator 17 mismatches.

Figure 8:
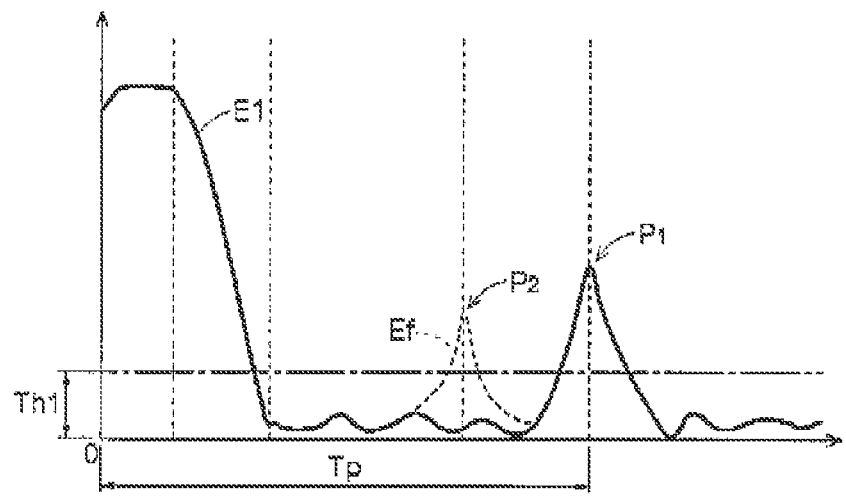
FIG. 8 is an explanatory view of avoidance of erroneous detection.

In FIG. 8, in addition to the line E1 illustrated in FIG. 7, the incidence of an ultrasonic wave having a vibration peak P2 is illustrated as overlapping as a line Ef. This line Ef is obtained when the piezoelectric element 31 receives an ultrasonic wave emitted from another distance measurement device mounted on the other vehicle 300 (see FIG. 1), for example, ore reflected wave of the ultrasonic wave.

In a case illustrated in FIG. 8, the ultrasonic wave having the vibration peak P2 does not include a signal including a predetermined code. Thus, even when the vibration peak P2 exceeds the threshold Th1, since the comparator 17 makes a determination of mismatch, the controller 1 may recognize that the ultrasonic wave having the vibration peak P2 received by the piezoelectric element 31 is not the reflected wave of the ultrasonic wave oscillated by the piezoelectric element 31.

In this way, by oscillating the ultrasonic wave including the predetermined code and receiving the oscillated ultrasonic wave, the controller 1 may avoid erroneous detection and improve the measurement performance of the distance measurement device 100.

Supplementary Description About Road Surface Information

The road surface information stored in the road surface information DB 71 is supplemented based on FIG. 7.

For example, a well-paved road is flat. Thus, as exemplified in FIG. 7, a road from which distance information indicating that a reflected wave which is not small is not found and a small reflected wave is continuously detected may be obtained is stored in the road surface information DB 71 as being a well-paved road.

In addition, unevenness which is not large is often found in a damaged paved road. Thus, a road in which a reflected wave which is not small is sometimes found and a small reflected wave is normally continuously detected is stored in the road surface information DB 71 as being, for example, a damaged paved road.

In a case of a gravel road, unevenness which is not large continuously exists. Thus, a road in which a reflected wave which is not small is continuously detected is stored in the road surface information DB 71 as being, for example, a gravel road.

In a case of an unpaved road, unevenness which is large exists. Thus, a road in which a reflected wave which is not small or a slightly large reflected wave is detected irregularly is stored in the road surface information DB 71 as being, for example, an unpaved road.

As for Change in Detection Condition

A change in detection condition will be described.

Figure 9:
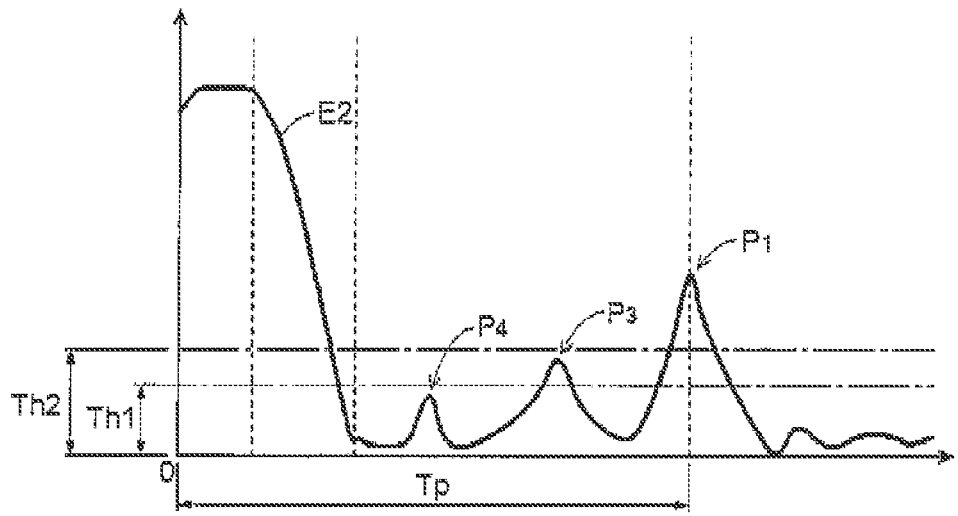
FIG. 9 is an explanatory view of a change in detection condition.

The line E2 illustrated in FIG. 9 is the envelope of the amplitude of a vibration of the piezoelectric element 31 as in the line E1 illustrated in FIG. 7, but has a vibration peak P3 and a vibration peak P4 together with the vibration peak P1 of the reflected wave from the obstacle 91, unlike the line E1 illustrated in FIG. 7. In addition, each of the reflected waves having the vibration peak P1, the vibration peak P3, and the vibration peak P4 has information including a predetermined code.

In addition, FIG. 9 further illustrates the threshold Th1 and a threshold Th2 greater than the threshold Th1.

Here, as described above, the threshold Th1 is a threshold in a case of a well-paved road.

In addition, the threshold Th2 is a threshold in a case of an unpaved road.

Similarly to the threshold Th1, the threshold Th2 is a value that is stored in advance in the measurement condition DB 42 in the present embodiment, and is an example of the detection relationship information in the present embodiment.

In FIG. 9, the vibration peak P1 is located at a position larger than the threshold Th2 and the threshold Th1. The vibration peak P3 is located at a position larger than the threshold Th1 but smaller than the threshold Th2, The vibration peak P4 is located at a position smaller than the threshold Th1.

As described above, since each of the reflected waves having the vibration peak P1, the vibration peak P3, and the vibration peak P4 has information including a predetermined code, the reflected waves having the vibration peak P1, the vibration peak P3, and the vibration peak P4 are considered to be reflected waves of the ultrasonic waves oscillated by the piezoelectric element 31, respectively. Therefore, in the example of FIG. 9, it is necessary to determine whether the vibration peak P3 and the vibration peak P4 are reflected waves of the obstacle 91 or reflected waves due to the unevenness 93 on the road 92.

Thus, in the present embodiment, the controller 1 may perform measurement with high accuracy regardless of the state of the road surface by selecting the threshold corresponding to the road 90 that is currently being measured as follows.

Upon measurement, the controller 1 first acquires road surface information about the road that is currently being measured (the current traveling road) from the road information server 61.

When the controller 1 acquires, for example, information that the road 92 is a well-paved road as road surface information, the controller 1 compares the road surface information with the detection relationship information read from the measurement condition DB 42, and selects the threshold Th1.

Next, the controller 1 compares the threshold Th1 with the line E2 as distance information.

In a case of FIG. 9, since the vibration peak P3 is larger than the threshold Th1, the reflected wave of the obstacle 91 is determined. On the other hand, since the vibration peak P3 is smaller than the threshold Th1, the unevenness 93 on the surface of the road 92 is determined.

On the other hand, when the controller 1 acquires information that the road 92 is an unpaved as road surface information, the controller 1 compares the road surface information with the detection relationship information read from the measurement condition DB 42, and selects the threshold Th2.

Next, the controller 1 compares the threshold Th2 with the line E2 as distance information.

In a case of FIG. 9, since the vibration peak P3 and the vibration peak P4 are smaller than the threshold Th2, the unevenness 93 on the surface of the road 92 is determined.

As described above, by acquiring the read surface information about the road 92 that is currently being measured from the road information server 61, comparing the road surface information with the detection relationship information and the distance information, and setting (selecting) an appropriate threshold, measurement may be performed with high accuracy regardless of the state of the road surface, such as by identifying and detecting the unevenness 93 on the road 92 and the obstacle 91 regardless of the state of the road surface of the road 92, whereby it is possible to improve the measurement performance of the distance measurement device 100.

As for Transmission of Distance Information

In the present embodiment, the controller 1 transmits distance information to the road information server 61, and stores the distance information in the distance information DB 72. Specifically, the road information server 61 stores the received distance information in the distance information DB 72 of the storage server 7 based on a request from the controller 1.

In addition, in the present embodiment, when the acquired distance information changes by a predetermined amount or more compared to the distance information transmitted to the road information server 61 immediately before, the controller 1 transmits the acquired distance information to the road information server 61 and stores the acquired distance information in the temporary storage DB 49.

In the present embodiment, upon acquiring the distance information (hereinafter referred to as "the latest information"), the controller 1 reads the distance information (hereinafter referred to as "immediately preceding information") transmitted immediately before to the road information server 61 from the temporary storage DB 49. Then, the controller 1 compares the latest information with the immediately preceding information, and transmits the latest information to the road information server 61 when the latest information changes compared to the immediately preceding information by a predetermined amount or more. On the other hand, the controller 1 compares the latest information with the immediately preceding information, and when the latest information does not change by a predetermined amount or more compared to the immediately preceding information, the controller 1 does not transmit the latest information to the road information server 61.

Here, examples of the change by a predetermined amount or more from the immediately preceding information may include an increase or decrease in the number of vibration peaks be detected and an increase or decrease in the average value of detected amplitudes.

In this way, by transmitting the latest information to the road information server 61 only when the latest information changes compared to the immediately preceding information, it is possible to reduce the amount of communication. In addition, it is possible to prevent an increase in the amount of communication, to avoid the congestion of a communication network, and to update information of the road information server as much as necessary.

Figure 10:
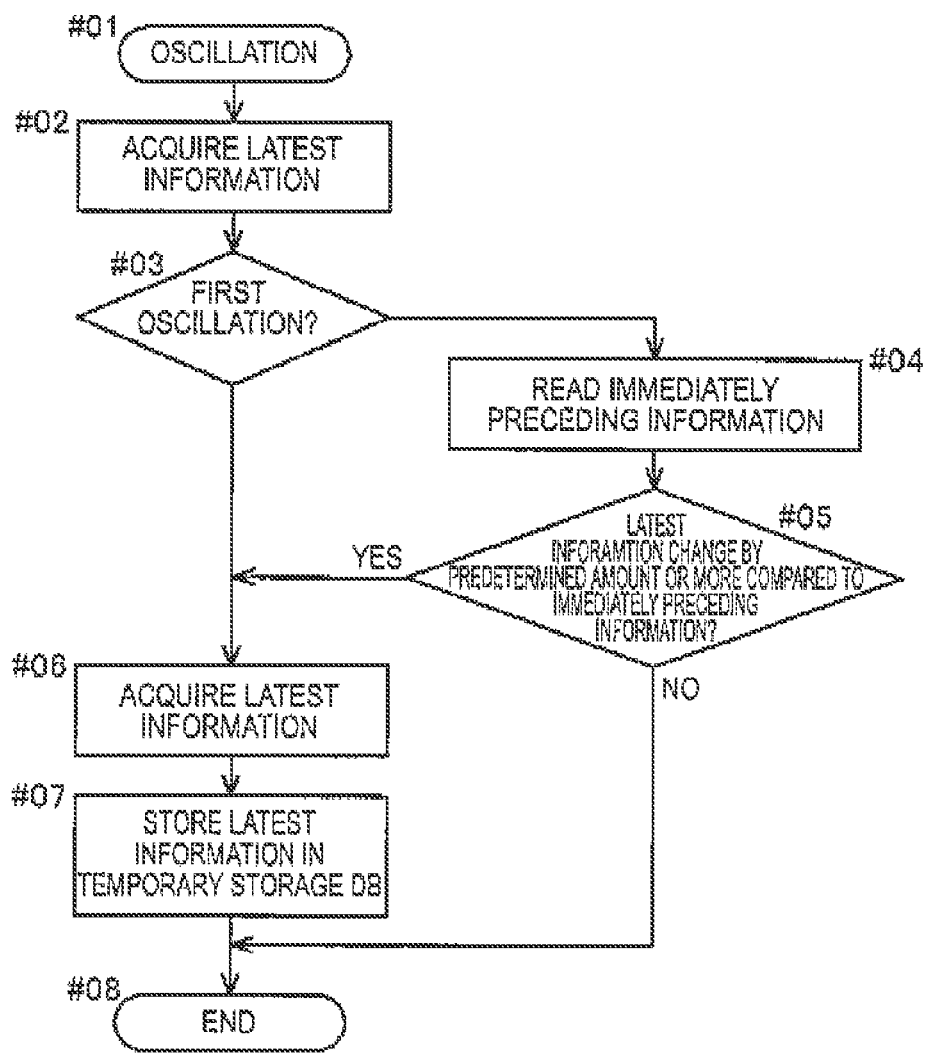
FIG. 10 is a flowchart of determination as to whether or not to transmit distance information to a road information server.
Figure 11:
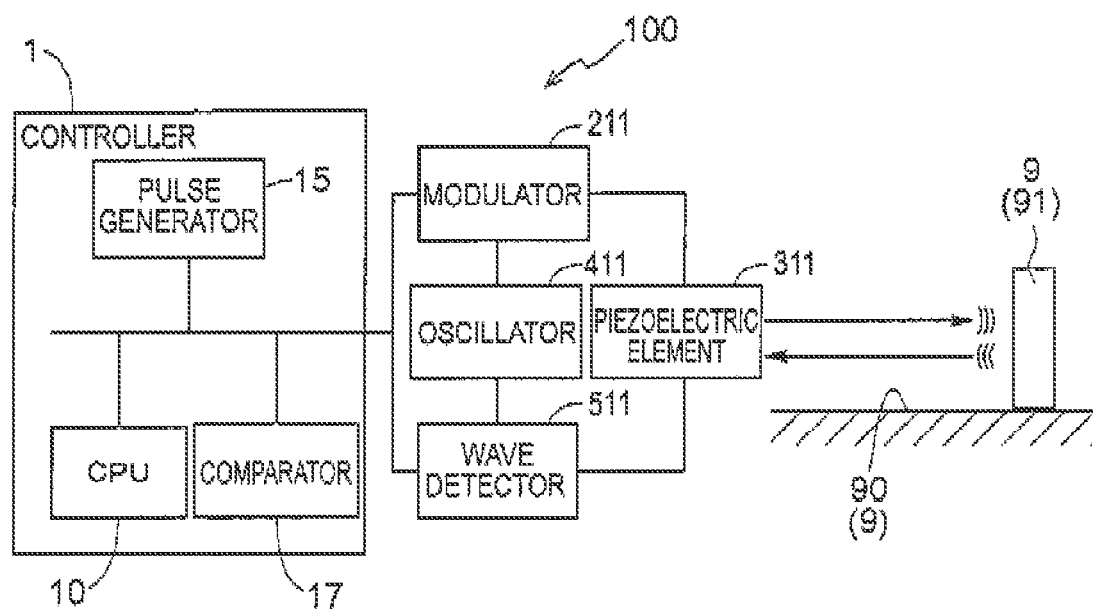
FIG. 11 is an explanatory view of a schematic configuration of a distance measurement device.

Hereinafter, a procedure of determining whether or not the controller 1 transmits the latest information to the road information server 61 will be described in accordance with the flowchart of FIG. 10.

When the piezoelectric element 31 of the distance measurement device 100 oscillates (step #01), the controller 1 acquires the latest information (step #02).

When the oscillation of step #01 is an initial oscillation after the vehicle 200 starts traveling (step #03: Yea), the controller 1 causes the vehicle-side communication unit 2 to transmit the latest information to the road information server 61 (step #06). In addition, the latest information is stored in the temporary storage DB 49 (step #07), and the determination terminates (step #08).

When the oscillation of step #01 is not the initial oscillation (step #03: No), the procedure proceeds to step #04, and the immediately preceding information is read from the temporary storage DB 49 (step #04).

Then, when the latest information is different from the immediately preceding information by a predetermined amount or more, the procedure proceeds to step #06.

When the latest information is not different by the predetermined amount or more from the immediately preceding information, the procedure proceeds to step #08 and the determination terminates (step #08).

As described above, it is possible to provide a distance measurement device which improves the measurement performance of distance measurement.

As for Shortest Measurable Distance

The shortest measurable distance of the distance measurement by the TOF method used in another embodiment 1 (FIG. 11) is supplemented.

As can be seen from FIG. 7, in the distance measurement by the TOF method, it is necessary to receive a reflected wave at least after the oscillation time T1 and the reverberation time T2 have passed. That is, the shortest measurable distance by the TOF method using an ultrasonic wave is half the value obtained by multiplying the sound speed by the sum of the oscillation time T1 and the reverberation time T2.

Thus, for example, when the oscillation time T1 is shortened, the shortest measurable distance may be made into a shorter distance, short-range measurement may be possible, and the measurable distance range (the measurement range of the distance measurement device 100) may be enlarged.

As for Modulation of Ultrasonic Wave

In another embodiment 1 (FIG. 11), as illustrated in FIG. 6, the piezoelectric element 311 oscillates a modulated ultrasonic wave using the phase modulation scheme and the amplitude modulation scheme at the same time.

In another embodiment 1, a case where the pulse generator 15 oscillates a signal including an 8-bit code and the piezoelectric element 311 oscillates a modulated ultrasonic wave including information on the 8-bit code will be described by way of example.

FIG. 6 illustrates the waveform W of a vibration in a case where the pulse generator 15 transmits a pulse signal including an 8-bit code of [11111000] in order from the most significant bit, the modulator 211 modulates and represents each bit using the amplitude modulation scheme and the phase modulation scheme alternately in order from the high-order bit to the low-order bit, and the piezoelectric element 311 (see FIG. 11) oscillates an ultrasonic wave corresponding to the modulated wave.

In addition, FIG. 6 illustrates a case where the modulator 211 modulates the burst length of a portion representing "0" by the amplitude modulation scheme into a burst length that is half that of a portion representing "1" by the amplitude modulation scheme.

As can be seen from FIG. 6, in the present embodiment, since the modulator 211 modulates a carrier wave using at least the phase modulation scheme and the amplitude modulation scheme as a plurality of modulation schemes at the same time, it is possible to transmit a larger number of transmission bits (long code string) within a short time.

In this way, since it is possible to transmit a larger number of transmission bits within a short time, it is possible to set a large number of identification signals sir identification IDs, for example, kind to reduce, for example, the risk of crosstalk with other distance measurement devices.

In addition, in another embodiment 1, since it is possible to transmit a larger number of transmission bits within a short time, it is possible to further shorten the oscillation time T1 as long as there is the number of transmission bits (the same code string). Therefore, it is also possible to shorten the osculation time T1 and enlarge the measurement area of the distance measurement device 100.

As described above, it is possible to provide a distance measurement device which achieves an improvement in the measurement performance of distance measurement.

The modulator 212 performs modulation with a predetermined modulation protocol in response to an instruction from the controller 1.

In another embodiment 2 (FIG. 13), the modulator 212 oscillates a modulated wave via arbitrary switching between the modulation schemes or a combination of the modulation schemes in response to an instruction from the controller 1.

In addition, the modulator 212 modulates based on information on a signal supplied from the pulse generator 15 as the controller 1, whereas in another embodiment 2, the controller 1 changes code information as necessary. Therefore, the modulator 212 modulates to obtain a predetermined bit length and a predetermined bit array according to a change in the information on the signal of the pulse generator 15 as the instruction from the controller 1.

In addition, in another embodiment 2 (FIG. 13), the piezoelectric element 312 may oscillate the modulated ultrasonic wave using any one of the phase modulation scheme, the amplitude modulation scheme, and the frequency modulation scheme, or a combination thereof according to the modulated wave output from the modulator 212.

Hereinafter, a case where the modulator 212 performs modulation using two modulation schemes including the phase modulation scheme and the amplitude modulation scheme at the same time to output a modulated wave and the piezoelectric element 312 oscillates an ultrasonic wave corresponding to the modulated wave will be described by way of example.

FIG. 8 illustrates an example of the waveform of an ultrasonic wave when the piezoelectric element 312 oscillates the ultrasonic wave modulated using the phase modulation scheme and the amplitude modulation scheme at the same time.

As for Determination of Modulation Protocol

FIG. 13 illustrates a case where another vehicle 200 oscillates an ultrasonic wave for the purpose of, for example, detecting an obstacle. The ultrasonic wave oscillated by the vehicle 200 is hereinafter referred to as "noise."

When the noise is modulated by the same protocol as the modulation protocol used by the distance measurement device 100, there is a possibility that the ultrasonic wave oscillated by the distance measurement device 100 interferes with the noise.

Thus, in another embodiment 2, when oscillating the ultrasonic wave to which the identification signal is added from the piezoelectric element 312 (outputting the modulated wave by the modulator 212), the distance measurement device 100 beforehand receives a surrounding ultrasonic wave (e.g., the above noise) using the piezoelectric element 312 and demodulates the surrounding ultrasonic wave using the wave detector 512. Therefore, the controller 1 may beforehand know a modulation scheme of the surrounding ultrasonic wave or a scheme of a signal included in the surrounding ultrasonic wave, for example, the demodulated signal of the surrounding ultrasonic wave, i.e., a modulation protocol of the surrounding ultrasonic wave (noise in a case of FIG. 13).

In addition, examples of the time when oscillating the ultrasonic wave to which the identification signal is added from the piezoelectric element 312 or the time when the modulator 212 outputs the modulated wave include a case where the piezoelectric element 312 firstly oscillates after the distance measurement device 100 is switched on (after energization is started), the time when performing each oscillation in a case where the piezoelectric element 312 intermittently oscillates, and the time when the piezoelectric element 312 oscillates for a predetermined period of time or a predetermined number of times and then, again starts oscillation for a predetermined period of time or a predetermined number of times.

In addition, when oscillating the ultrasonic wave to which the identification signal is applied from the piezoelectric element 312, "beforehand" means that, for a period of time during which the piezoelectric element 312 oscillates or during which the reflected wave of the ultrasonic wave oscillated by the piezoelectric element 312 to which the identification signal is added is not received, the surrounding ultrasonic wave (noise) is received and the modulation protocol of the surrounding ultrasonic (noise) is known.

Then, the controller 1 determines the protocol from the demodulated signal, and outputs information on the protocol of the demodulated signal to the modulator 212. In another embodiment 2, as a scheme of the demodulated signal, the controller 1 outputs information on a command to the modulator 212 to modulate the ultrasonic wave by a protocol different from that of the noise, i.e., by a modulation scheme of the ultrasonic wave different from that of the noise, or to modulate by adding an identification signal (signal) different from that of the noise.

The modulator 212 modulates a carder wave with a protocol different from a protocol of the noise based on the information on the command of the controller 1.

Figure 15:
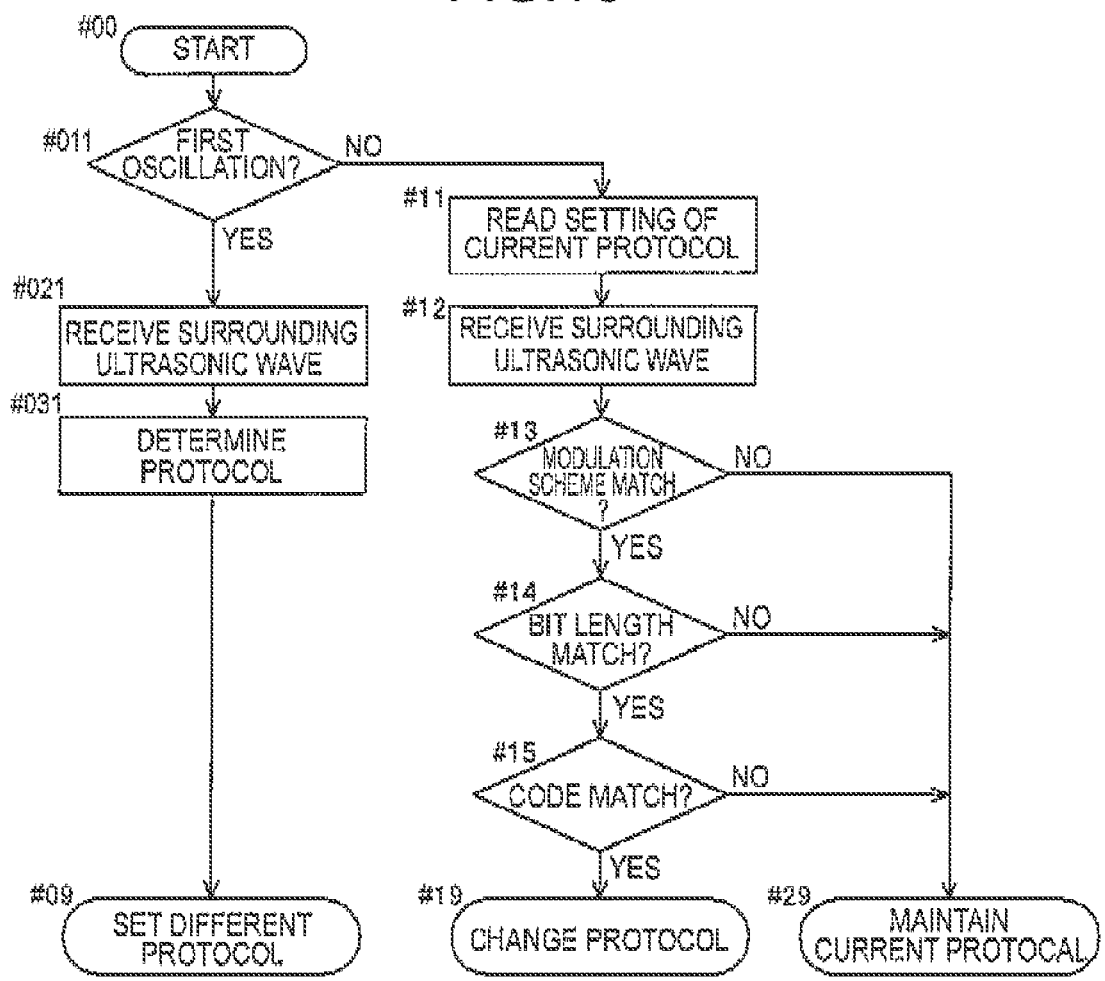
FIG. 15 is a flowchart explaining a procedure of determining a modulation protocol.

Hereinafter, a procedure in which the controller 1 (the CPU 10) determines a protocol of the demodulated signal and decides a modulation protocol will be described with reference to FIG. 15.

When the distance measurement device 100 starts measurement (step #00), the distance measurement device 100 first checks whether the oscillation of the ultrasonic wave is the first time (step #011), Here, "the first time" means that the setting of a protocol of the ultrasonic wave to be oscillated from now is not stored in the storage unit 19. For example, the first time means a case where the ultrasonic wave firstly oscillates after the distance measurement device 100 is switched off and record e the setting of a protocol of the ultrasonic wave to be oscillated from now is erased (initialized or reset), for example, in the storage unit 19, and thereafter, the distance measurement device 100 is again switched on.

When the oscillation of the ultrasonic wave is not the first time (step #011: No), the procedure proceeds to step #11. Steps after step #11 will be described later.

When the oscillation of the ultrasonic wave is the first time (step #011: Yes), the procedure proceeds to step #021 to receive a surrounding ultrasonic wave by the piezoelectric element 312 (step #021). Then, the comparator 17 acquires the demodulated signal from the wave detector 512 as the controller 1 to determine a protocol of the surrounding ultrasonic wave (step #031), and sets an ultrasonic wave protocol different from the protocol of the surrounding ultrasonic wave as a protocol of the ultrasonic wave to be oscillated from now and records the setting In the storage unit 19.

Thereafter, the controller 1 transmits the setting to the modulator 212. The modulator 212 transmits the modulated wave which is modulated according to the setting to the piezoelectric element 312. The piezoelectric element 312 which has received the modulated wave oscillates the ultrasonic wave for distance measurement as the distance measurement device 100.

Step #11 and the following steps will be described.

In step #11, the CPU 10 reads out and acquires, from the storage unit 19, the setting related to the currently set protocol (hereinafter referred to as a "current protocol") as the controller 1.

Next, the controller 1 receives the surrounding ultrasonic wave using the piezoelectric element 312 (step #13).

Next, the comparator 17 acquires the demodulated signal from the wave detector 512 as the controller 1, and compares the demodulated signal with the current protocol (steps #13 to #15).

In step #13, first, it is determined whether or not the modulation scheme of the demodulated signal and the modulation scheme selected by the current protocol match.

When the modulation schemes do not match (step #13: No), the procedure proceeds to step #29 to maintain the current protocol.

When the modulation schemes match (step #13: Yes), the procedure proceeds to step #14.

In step #14, it is determined whether or not the bit length of the demodulated signal and the bit length set by the current protocol match.

When the bit lengths do not match (step #14: No), the procedure proceeds to step #29 to maintain the current protocol.

When the bit lengths match (step #14: Yes), the procedure proceeds to step #15.

In step #15, it is determined whether or not the bit array (code) of the demodulated signal and the bit array (code) set by the current protocol match.

When the bit arrays do not match (step #15: No), the procedure proceeds to step #19 to maintain the current protocol.

When the bit arrays match (step #15: Yes), the procedure proceeds to step #19 to change the protocol.

In another embodiment 2 (FIG. 13), when changing the protocol, for example, the protocol may be changed so that all of the modulation scheme, the bit length, and the bit array are different.

When the surrounding ultrasonic wave received by the piezoelectric element 312 uses the frequency modulation scheme, the bit length of the signal included in the surrounding ultrasonic wave is 4 bits, and the bit array is [0101], for example, the protocol may be changed as follows.

That is, an amplitude/phase modulation scheme for modulation using two modulation schemes including the phase modulation scheme and the amplitude modulation scheme at the same time may be selected as a modulation scheme different from the frequency modulation scheme. In addition, the bit length of the identification signal may be set to a bit length different from 4 bits, for 8 bits. In addition, the bit array may be set to a different bit array from [0101], for example, [11111000]. In addition, in this example, the bit array [0101] of the signal included in the surrounding ultrasonic wave is set so as not to be included in the bit array [11111000] of the identification signal.

As described above, it is possible to provide a distance measurement device which achieves an improvement in the measurement performance of distance measurement.

Other Embodiments (1) In the above embodiment, the resonance frequency of the piezoelectric element 31 is set to 40 kHz, but the resonance frequency of the piezoelectric element 31 is not limited thereto, and may be arbitrarily set in a sound range (frequency band) exceeding the human audible range. In addition, the sound range exceeding the human audible range means a range of ultrasonic waves having a frequency band of, for example, 20 kHz or more.

(2) The above embodiment has described a case where the modulator 32 modulates using two modulation schemes including the phase modulation scheme and the amplitude modulation scheme at the same time.

However, in addition to the two modulation schemes including the phase modulation scheme and the amplitude modulation scheme, the modulator 32 may further use the frequency modulation scheme at the same time.

By using a greater number of modulation schemes at the same time, transmission with a larger number of transmission bits is possible within a short time.

Alternatively, the modulator 32 may modulate using any one of the phase modulation scheme, the amplitude modulation scheme, and the frequency modulation scheme.

(3) The above embodiment has described a case where the controller 1 transmits distance information to the road information server 61 and the road information server 61 stores the distance information in the distance information DB 72 of the storage server 7 based on a request from the controller 1.

However, when the controller 1 transmits the distance information to the road information server 61, the road information server 61 may spontaneously store the distance information (even without a request from the controller 1) in the distance information DB 72 of the storage server 7.

(4) The above embodiment has described a case where the bit length is 8 bits as a predetermined bit length by way of example.

However, the bit length may be arbitrarily set, and the bit length required for crosstalk prevention may be selected. For example, the bit length may be 16 bits.

(5) The above embodiment has exemplified a case where the controller 1 transmits the acquired distance information to the road information server 61 when the acquired distance information changes by a predetermined amount or more compared to the distance information transmitted immediately before to the road information server 61.

However, the controller 1 may also transmit the acquired distance information to the road information server 61 whenever the distance information is acquired. In addition, the controller 1 may collectively transmit the acquired distance information which is acquired multiple times to the road information server 61.

(6) The above embodiment has exemplified a case where the TOF sensor unit 3 includes the piezoelectric element 31 which oscillates the ultrasonic wave.

However, instead of the piezoelectric element 31, a light emitting device such as, for example, an LED that emits light, or a device that oscillates an electromagnetic wave such as, for example, a terahertz wave may be provided.

(7) The above embodiment has described, in the description related to a change in the detection condition, an example in which the controller 1 selects the threshold Th1 when acquiring information that the road 92 is a wall-paved road as road surface information and selects the threshold Th2 when acquiring information that the road 92 is an unpaved road.

However, in addition to the information that the road is a well-paved road or the information that the road is an unpaved road as the road surface information, the controller 1 may acquire more detailed road surface information such as, for example, information that the road is a damaged paved road or information that the road is a gravel road. In this case, the controller 1 may set individual thresholds so as to correspond to these detailed road surface information and may store the set thresholds in the measurement condition DB 42 in advance. Then, the controller 1 may select the thresholds in a switching manner according to the acquired detailed road surface information.

(8) The above embodiment has exemplified a case where, as the controller 1, the CPU 10 compares the detection relationship information recorded in advance in the measurement condition DB 42 with the road surface information about the road that is currently being measured, acquired from the road surface information DB 71 via the road information server 61 and the distance information acquired by the TOF sensor unit 3 so as to detect the obstacle 91, and determines the detection condition of the obstacle 91 an the road that is currently being measured. In addition, the road surface information is exemplified as information classifying the state of the road.

However, instead of acquiring the road surface information which is the information classifying the state of the road from the road surface information DB 71 via the road information server 61, the controller 1 may acquire ideal distance information that is assumed to be acquired when measuring the road that is currently being measured (information on the reflected wave assumed to be received by the piezoelectric element 31) as the road surface information.

(9) The above embodiment has exemplified a case where, when representing a code, for example, in a case of the phase modulation scheme, a case where the same phase as the carrier wave represents "1" in binary number, the phase shifted by π from the carrier wave represents "0" in binary number, and the minimum unit of the code is binary.

However, the representation of the code is not limited to the above example. Besides binary numbers, other positional notation methods, for example, decimal numbers may be used. In addition, it is also possible to perform modulation exceeding binary in each modulation scheme.

Specifically, for example, in a case of the phase modulation scheme, the same phase as the carrier wave may represent "0" in decimal number, the phase shifted by π/4 from the carrier wave may represent "1" in decimal number, the phase shifted by π/2 may represent "2" in decimal number, and the phase shifted by 3π/4 may represent "3" in decimal number, so that the phases may be represented by four values. In this case, the phase may represent a binary number, other than a decimal number, as in the above embodiment. For example, the same phase as the carrier wave may represent "00" in binary number, the phase shifted by π/4 from the carrier wave may represent "01" in binary number, the phase shifted by π/2 may represent "10" in binary number, and the phase shifted by 3π/4 may represent "11" in binary number.

Likewise, in a case of the amplitude modulation scheme or the frequency modulation scheme, it is possible to adopt other positional notation method than the binary number and to perform modulation exceeding binary. For example, in a case of the amplitude modulation scheme, it is possible to set four levels as the amplitude gradation and to represent four values of "00" "01," "10," and "11" in binary number, or four values of "0," "1," "2," and "3" in decimal number. In addition, it is possible to set a greater number of levels and to represent more than four values. Likewise, even in a case of the frequency modulation scheme, it is possible to set a multi-level frequency change with respect to the carrier wave and to represent multiple values.

(10) The above embodiment has exemplified a case where, in a case of modulation by the amplitude modulation scheme, fora relatively large amplitude representing "1" in binary number, when the amplitude is assumed to be 100%, modulation of an amplitude of 50% is controlled as a target amplitude in a case of representing "0" in binary number, and an amplitude equal to or less than 75% Which is the average value of 100% and 50% is assumed to represent "0" in binary number.

However, in a case of modulation by only the amplitude modulation scheme, when representing "0" in binary number, modulation of an amplitude of 0% may be controlled as a target amplitude in a case of representing "0" in binary number. In this case, for example, an amplitude equal to or less than 50% which is the average value of 100% and 0% may be assumed to represent "0" in binary number.

(11) The above embodiment has exemplified a case where the TOF sensor unit 3 includes the piezoelectric element 31 which oscillates an ultrasonic wave, the oscillator 34 which oscillates a fundamental wave of the ultrasonic wave oscillated by the piezoelectric element 31, and the modulator 32 which modulates the fundamental wave oscillated by the oscillator 34, the modulator 32 may modulate by a modulation scheme depending on an instruction from the controller 1, and the modulator 32 may oscillate a modulated wave by any one of the phase modulation scheme, the amplitude modulation scheme, and the frequency modulation scheme, or a combination thereof depending on the instruction from the controller 1.

However, the TOF sensor unit 3 does not necessarily need to have the modulator 32, and the modulator 32 does not necessarily need to oscillate the modulated wave. For example, the TOF sensor unit 3 may oscillate an ultrasonic wave corresponding to the fundamental wave from the piezoelectric element 31.

(12) The above embodiment has described a case where the modulator 211 modulates the burst length of a portion representing "0" by the amplitude modulation scheme into a burst length that is half that of a portion representing "1" by the amplitude modulation scheme.

However, the burst length of the portion representing "0" by the amplitude modulation scheme may be the same as the burst length of the portion representing "1" by the amplitude modulation scheme.

(13) The above embodiment has exemplified a case where the modulator 211 modulates a signal of 8 bits generated by the pulse generator 15 for each bit using the amplitude modulation scheme and the phase modulation scheme alternately in order from the high-order bit to the low-order bit.

However, the modulator 211 may modulate and represent the upper 4 bits by the phase modulation scheme, and may modulate and represent the lower 4 bits by the amplitude modulation scheme.

(14) The above embodiment has described that the pulse generator 15 may generate a signal including a binary number code of a predetermined bit array with a predetermined bit length, for example, a bit length of 8 bits may be selected as the predetermined bit length, and an arbitrary array may be selected as the predetermined bit array. In this case, as an arbitrary array, a parity bit for error detection may be included.

For example, in a case of the bit length of 8 bits, the most significant bit may be set to "1" and the least significant bit may be used as a parity bit for error detection. For error detection, for example, an odd parity method can be used.

In addition, in the above embodiment, since it is possible to transmit a larger number of transmission bits, it is also possible to improve discrimination by adopting an error correction bit, for example, in addition to adopting a parity bit.

(15) The above embodiment has described a case where the modulator 212 modulates the burst length of a portion representing "0" by the amplitude modulation scheme into a burst length that is half that of a portion representing "1" by the amplitude modulation scheme.

However, the burst length of the portion representing "0" by the amplitude modulation scheme may be the same as the burst length of the portion representing "1" by the amplitude modulation scheme.

(16) The above embodiment has exemplified a case where the modulator 212 modulates a signal of 8 bits generated by the pulse generator 15 for each bit using the amplitude modulation scheme and the phase modulation scheme alternately in order from the high-order bit to the low-order bit.

However, the modulator 212 may modulate and represent the upper 4 bits by the phase modulation scheme, and may modulate and represent the lower 4 bits by the amplitude modulation scheme.

(17) The above embodiment has exemplified a case where the procedure proceeds to step #11 when the oscillation of the ultrasonic wave is not the first time and the demodulated signal is compared with the current protocol (steps #13 to #15). Then, the above embodiment has described a case where the controller 1 determines whether the modulation scheme, the bit length, and the bit array of the demodulated signal match or mismatch in this order, and maintains the current protocol when mismatch is determined first.

However, the controller 1 may maintain the current protocol when all of the modulation scheme, the bit length, and the bit array of the demodulated signal mismatch. By doing so, erroneous detection may be more reliably prevented. For example, a signal with a bit array of [0101] and a signal with a bit array of [01010101] have different bit lengths, but even when they contain portions having the same bit array, it is possible to reliably prevent erroneous detection.

(18) The above embodiment has exemplified a case where, when one ultrasonic transducer unit is used as the piezoelectric element 312 to oscillate an ultrasonic wave corresponding to a modulated wave, the piezoelectric element 312 is used as an oscillation element, and the same piezoelectric element 312 is used as a vibration receiving element when receiving a surrounding ultrasonic wave.

Figure 16:
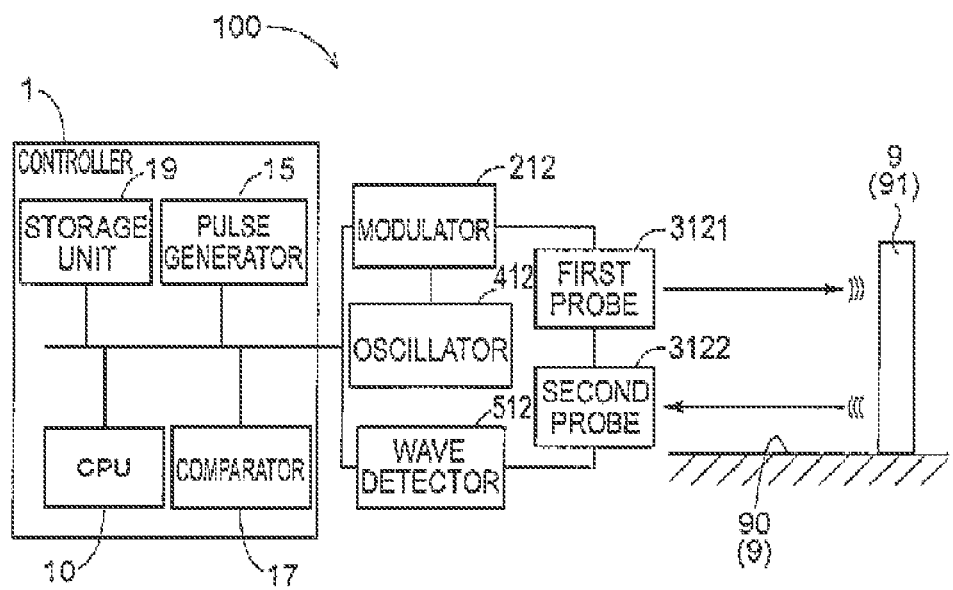
FIG. 16 is an explanatory view of another configuration of the distance measurement device.

However, as illustrated in FIG. 16, a first probe 3121 (3) may be assigned as the receiving element and a second probe 3122 (3) (an example of the piezoelectric element unit) may be assigned as the oscillation element. In this way, since it is possible to receive a reflected wave and other sound waves using the second probe 3122 (3) while oscillating the ultrasonic wave using the first probe 3121 (3), it is possible to more reliably prevent crosstalk and to improve the accuracy of distance measurement.

In this case, it suffices that the first probe 3121 (3) may receive at least an ultrasonic wave, and may be a unit with a simple configuration optimized for receiving a vibration without requiring, for example, a circuit or control required for oscillation of the ultrasonic wave. In addition, a unit constituting the first probe 3121 (3) may be other than a piezoelectric element.

Similarly, it suffices that the second probe 3122 (3) may oscillate an ultrasonic wave, and may be a unit having a piezoelectric element with a simple configuration without requiring, for example, a circuit or control required for oscillation of the ultrasonic wave.

(19) The above embodiment has exemplified a case where, when changing a protocol different from noise, the protocol is changed so that the demodulation scheme, the bit length, and the bit array are different.

However, other schemes may be changed in addition to the modulation scheme, the bit length, and the bit array, or except the modulation scheme, the bit length, and the bit array. For example, the burst length may be changed to a burst length different from that of the noise.

(20) The above embodiment has exemplified a case where, when representing a code, for example, in a case of the phase modulation scheme, the same phase as the carrier wave represents "1" in binary number, the phase shifted by $\pi$ from the carrier wave represents "0" in binary number, and the minimum unit of the code is binary.

However, the representation of the code is not limited to the above example. Besides binary numbers, other positional notation methods, for example, decimal numbers may be used. In addition, it is also possible to perform modulation exceeding binary in each modulation scheme.

Specifically, for example, in a case of the phase modulation scheme, the same phase as the carrier wave may represent "0" in decimal number, the phase shifted by $\pi/4$ from the carrier wave may represent "1" in decimal number, the phase shifted by $\pi/2$ may represent "2" in decimal number, and the phase shifted by $3\pi/4$ may represent "3" in decimal number, so that the phases may be represented by four values. In this case, the phase may represent a binary number, other than a decimal number, as in the above embodiment. For example, the same phase as the carrier wave may represent "00" in binary number, the phase shifted by $\pi/4$ from the carrier wave may represent "01" in binary number, the phase shifted by $\pi/2$ may represent "10" in binary number, and the phase shifted by $3\pi/4$ may represent "11" in binary number.

Likewise, in a case of the amplitude modulation scheme or the frequency modulation scheme, it is possible to adopt other positional notation method than the binary number and to perform modulation exceeding binary. For example, in a case of the amplitude modulation scheme, it is possible to set four levels as the amplitude gradation and to represent four values of "00," "01," "10," and "11" in binary number, or four values of "0," "1," "2," and "3" in decimal number. In addition, it is possible to set a greater number of levels and to represent more than four values. Likewise, even in a case of the frequency modulation scheme, it is possible to set a multi-level frequency change with respect to the carrier wave and to represent multiple values.

A feature of an obstacle detection sensor according to an aspect of this disclosure resides in that the obstacle detection sensor includes a controller configured to determine a detection condition of an obstacle on a road, a distance sensor unit configured to acquire distance information by oscillating a vibration wave and receiving a reflected wave of the oscillated vibration wave, a communication unit configured to communicate with an outside to acquire road surface information, and a storage unit configured to store detection relationship information for identifying the obstacle based on the distance information, wherein the controller compares the detection relationship information read from the storage unit with the distance information and the road surface information acquired from the distance sensor unit and the communication unit to determine the detection condition.

According to the above configuration, when continuing acquisition of distance information, i.e., information based on the presence of an obstacle or unevenness on the road surface as TOF information acquired from a reflected wave by a so-called TOF type distance sensor unit which oscillates (transmits) a vibration wave such as, for example, an ultrasonic wave or light and receives a reflected wave of the oscillated vibration wave, the controller can determine the detection condition of the obstacle on the road that is currently being measured by comparing the detection relationship information recorded in advance in the storage unit thereof with the road surface information about the road that is currently being measured, acquired from the outside, and the distance information acquired by the distance sensor unit so as to detect the obstacle. Here, the road surface information is information as to what the state of unevenness is on the road surface of the road.

That is, the controller can determine (change) the detection condition of the obstacle according to the state of unevenness of the road surface of the road that is currently being measured. For example, in a case of a paved road with little unevenness, the controller can change the detection condition so as to determine that a received reflected wave is not due to unevenness on the road but due to an obstacle even if the reflected wave is weak. In addition, in a case of a gravel road with large unevenness, the controller can change the detection condition so as to determine that a received reflected wave is due to unevenness on the road and not due to air obstacle even if the reflected wave is somewhat large.

Thus, according to the above configuration, it is possible to provide an obstacle detection sensor capable of performing measurement with high accuracy regardless of the state of the road surface, for example, by appropriately identifying and detecting an obstacle and unevenness on the road.

Another feature of the obstacle detection sensor according to the aspect of this disclosure resides in that the communication unit communicates with a road information server having an external storage unit that stores therein the road surface information, and the controller acquires the road surface information from the external storage unit.

According to the above configuration, the controller can acquire the road surface information from the external storage unit, i.e., a storage device of the road information server located outside the controller.

Thus, the obstacle detection sensor can acquire a required sufficient amount of information about the road that is currently being measured from the outside without having a large-capacity storage device therein. In addition, the obstacle detection sensor can easily use the latest road information that would be sequentially updated in the road information server.

Thus, according to the above configuration, it is possible to provide an obstacle detection sensor device capable of performing measurement with high accuracy even if the state of the road changes after the manufacture of an obstacle detection sensor.

Another feature of the obstacle detection sensor according to the aspect of this disclosure resides in that the controller transmits the distance information from the communication unit to the road information server and causes the road information server to record the distance information in the external storage unit.

Usually, most of the distance information acquired by the distance sensor unit is probability distance information with respect to the road surface. Thus, when the distance information acquired by the distance sensor unit is accumulated, distance information with respect to the obstacle included in the distance information is relatively diluted, and information on the distance to the road surface of the road that is measured, i.e., information on unevenness on the road surface becomes dominant. That is, the accumulated distance information is information approximate to the road surface information.

Thus, according to the above configuration, it is possible to store the distance information acquired by the distance sensor unit, i.e., the latest road surface information acquired by the distance sensor unit in the storage unit of the road information server and to update the road surface information of the road information server.

Another feature of the obstacle detection sensor according to the aspect of this disclosure resides in that the controller transmits the acquired distance information to the road information server when the acquired distance information changes by a predetermined amount or more compared to the distance information transmitted to the road information server immediately before.

For example, when the distance information acquired by the distance sensor unit is constantly transmitted to the road information server, the amount of communication may increase and congestion of a communication network may occur, which is a problem.

Thus, according to the above configuration, when acquiring the distance information, the controller transmits the acquired distance information to the road information server when the acquired distance information changes by a predetermined amount or more compared to the distance information transmitted to the road information server immediately before, i.e., the last distance information. Therefore, by preventing communication from occurring when there is no change beyond the predetermined amount or more, it is possible to reduce the amount of communication.

Thus, it is possible to avoid an increase in the amount of communication, to avoid the congestion of a communication network, and to update information of the road information server as much as necessary.

Another feature of the obstacle detection sensor according to the aspect of this disclosure resides in that the obstacle detection sensor further includes an environmental sensor unit configured to acquire an environmental value, and the controller corrects the distance information based on the environmental value acquired by the environmental sensor unit.

Characteristics of a vibration wave such as a propagation speed, in particular, the sonic speed of an ultrasonic wave fluctuates depending on an environmental value that is information on an environment such as, for example, an ambient temperature, humidity, or atmospheric pressure. Therefore, according to the above configuration, it is possible to accurately obtain the characteristics of the vibration wave, e.g., the sonic speed ot the ultrasonic wave based on the environmental value acquired by the environmental sensor unit and to acquire corrected accurate distance information.

Another feature of the obstacle detection sensor according to the aspect of this disclosure resides in that the communication unit communicates with an environmental information server that transfers an environmental value, and the controller acquires the environmental value from the environmental information server and corrects the distance information based on the environmental value.

Characteristics of a vibration wave such as a propagation speed, in particular, the sonic speed of an ultrasonic wave fluctuates depending on an environmental value that is information on an environment such as, for example, an ambient temperature, humidity, or atmospheric pressure. Therefore, according to the above configuration, it is possible to accurately obtain the characteristics of the vibration wave, e.g., the sonic speed of the ultrasonic wave based on the environmental value acquired by the environmental information server and to acquire corrected accurate distance information.

Another feature of the obstacle detection sensor according to the aspect of this disclosure resides in that the road information server is provided by cloud computing.

According to the above configuration, it is possible to share and store the road information of the road information server with a plurality of road information servers existing on a network while sharing the information with a large number of obstacle detection sensors connected via the network. In addition, it is possible to update the road information of the road information server by the large number of obstacle detection sensors.

Thus, it is possible to share the road information over the entire road network with the large number of obstacle detection sensors while maintaining the road information in the recent state. In addition, it is possible to safely preserve and update the information by sharing the information with the plurality of road information servers. That is, the obstacle detection sensor can acquire the latest road information and can improve the performance of distance measurement.

A feature of a distance measurement device according to another aspect of this disclosure resides in that the distance measurement device includes an oscillator configured to oscillate a carrier wave, a pulse generator configured to output a unique code as a pulse signal, a modulator configured to modulate the carrier wave and output a modulated wave corresponding to the pulse signal, a piezoelectric element configured to oscillate and receive an ultrasonic wave corresponding to the modulated wave, and a controller configured to calculate a distance based on the code obtained by demodulating a reflected wave of the ultrasonic wave received by the piezoelectric element, wherein the modulator modulates the carrier wave using a plurality of modulation schemes at the same time.

According to the above configuration, when a unique code required for sufficient crosstalk prevention or redundancy is added (applied) as an identification signal to the ultrasonic wave, since the modulator modulates the carrier wave using the plurality of modulation schemes at the same time, it is possible to increase the amount of information by the ultrasonic wave oscillated by the piezoelectric element within a given time, i.e., for a predetermined burst length. That is, it is possible to increase the amount of information that can be transmitted by the ultrasonic wave.

Thus, according to the above configuration, it is possible to provide a distance measurement device which increases the amount of information of an identification signal, thereby improving the measurement performance of distance measurement.

In addition, since it is possible to increase the amount of information that can be transmitted by the ultrasonic wave, it is possible to shorten a transmission time required to transmit an identification signal in the amount of information required for crosstalk prevention or redundancy. Therefore, it is possible to shorten an osculation time of the ultrasonic wave oscillated by the piezoelectric element and to shorten the shortest measurable distance. That is, according to the above configuration, in the distance measurement device, it is possible to achieve an improvement in the performance of distance measurement such as enlargement of a measurement area in short-range measurement.

Another feature of the distance measurement device according to the aspect of this disclosure resides in that the modulator uses at least two modulation schemes among a phase modulation scheme, an amplitude modulation scheme, and a frequency modulation scheme as the plurality of modulation schemes.

According to the above configuration, it is possible to provide a distance measurement device which increases a bandwidth in which the ultrasonic wave can be transmitted using at least two modulation schemes among the phase modulation scheme, the amplitude modulation scheme, and the frequency modulation scheme, thereby improving the measurement performance of distance measurement.

Another feature of the distance measurement device according to the aspect of this disclosure resides in that the modulator modulates the carrier wave using at least the amplitude modulation scheme and then converts the carrier wave into a burst wave corresponding to each pulse of the pulse signal, and the modulator shortens a burst length of the burst wave corresponding to the pulse at which an amplitude of the modulated wave converted by the amplitude modulation scheme is reduced compared to the burst length of the burst wave corresponding to the pulse at which the amplitude is increased.

The greater the amplitude of the modulated wave, the longer the time required until the amplitude of the burst wave oscillated by the piezoelectric element becomes the magnitude corresponding to the amplitude of the modulated wave. This is because a so-called rise time is required.

Therefore, when the amplitude of the modulated wave is small, the amplitude of the burst wave oscillated by the piezoelectric element quickly increases. On the other hand, when the amplitude of the modulated wave is large, an increase in the amplitude of the burst wave oscillated by the piezoelectric element is relatively delayed as compared with a case where the amplitude of the modulated wave is small.

Thus, when modulating the carrier wave using the amplitude modulation scheme, by shortening the burst length of the burst wave corresponding to the pulse at which the amplitude of the modulated wave is reduced compared to the burst length of the burst wave corresponding to the pulse at which the amplitude is increased, it is possible to increase the amount of information that can be transmitted by the ultrasonic wave for a given time. Thus, it is possible to provide a distance measurement device which improves the measurement performance of distance measurement.

A feature of a distance measurement device according to still another aspect of this disclosure resides in that the distance measurement device includes an oscillator configured to oscillate a carrier wave, a modulator configured to output a modulated wave obtained by adding an identification signal to the carrier wave by a predetermined scheme, an oscillation element configured to oscillate an ultrasonic wave corresponding to the modulated wave, a receiving element configured to receive the ultrasonic wave, a demodulation unit configured to demodulate the ultrasonic wave received by the receiving element to acquire a demodulated signal, and a controller configured to determine a scheme of the demodulated ultrasonic wave, in which the controller causes the receiving element to receive the ultrasonic wave beforehand when the modulator outputs the modulated wave, causes the demodulation unit to demodulate the received ultrasonic wave to acquire a demodulated signal, and determines a scheme of the demodulated signal to output information about the scheme to the modulator, and the modulator adds the identification signal to the carrier wave by a scheme different from the scheme of the demodulated signal based on the information and outputs the modulated wave.

According to the above configuration, when oscillating the ultrasonic wave to which the identification signal has been added, by causing the receiving element to receive a surrounding ultrasonic wave and acquiring the demodulated signal from the demodulation unit beforehand, the controller can know beforehand a modulation scheme of the surrounding ultrasonic wave or a scheme of a signal included in the surrounding ultrasonic wave, for example, the demodulated signal of the surrounding ultrasonic wave, i.e., a modulation protocol of the surrounding ultrasonic wave. In addition, in this disclosure, "receiving a vibration" refers to receiving, for example, an ultrasonic wave.

Therefore, the controller can output, to the modulator, information about the scheme of the demodulated signal, for example, information about the modulation scheme of the surrounding ultrasonic wave or the signal included in the surrounding ultrasonic wave, and can cause the modulator to add the identification signal to the carrier wave by a scheme different from the scheme of the demodulated signal.

As a result, the oscillation element can oscillate the ultrasonic wave by adding the identification signal to the ultrasonic wave by a scheme different from that of the surrounding ultrasonic wave. Then, by demodulating the ultrasonic wave received thereafter via the receiving element by the different scheme, the controller can distinguish the ultrasonic wave from the signal included in the surrounding ultrasonic wave, thereby being capable of accurately determining whether the received wave is a reflected wave of the ultrasonic wave oscillated by the oscillation element thereof or another ultrasonic wave.

Thus, according to the above configuration, it is possible to provide a distance measurement device which reduces the influence of interference with a surrounding ultrasonic wave, particularly, an ultrasonic wave including a signal, to prevent erroneous detection, and to improve the measurement performance of distance measurement.

Another feature of the distance measurement device according to the aspect of this disclosure resides in that the modulator outputs the modulated wave to which the identification signal having a bit array different from that of the demodulated signal is added.

According to the above configuration, the controller can more accurately determine whether the received wave is the reflected wave of the ultrasonic wave oscillated by the oscillation element thereof or another ultrasonic wave based on match or mismatch of the bit array of the ultrasonic wave received via the receiving element. As a result, the controller can accurately receive the identification signal thereof.

Another feature of the distance measurement device according to the aspect of this disclosure resides in that the bit array has a bit length different from that of the demodulated signal.

According to the above configuration, the controller can more accurately determine whether the received wave is the reflected wave of the ultrasonic wave oscillated by the oscillation element thereof or another ultrasonic wave based on match or mismatch of the bit length of the ultrasonic wave received via the receiving element. As a result, the controller can accurately receive the identification signal thereof.

Another feature of the distance measurement device according to the aspect of this disclosure resides in that the modulator outputs the modulated wave which is modulated by a scheme different from a modulation scheme for demodulation by the demodulation unit.

According to the above configuration, the controller can more accurately determine whether the received wave is the reflected wave of the ultrasonic wave oscillated by the oscillation element thereof or another ultrasonic wave based on match or mismatch of the modulation scheme of the ultrasonic wave received via the receiving element.

Another feature of the distance measurement device according to the aspect of this disclosure resides in that the oscillation element includes a piezoelectric element unit, and the receiving element is a unit different from the piezoelectric element unit.

According to the above configuration, the piezoelectric element unit used as the oscillation element may be a unit having a piezoelectric element with a simplified configuration as long as it can oscillate the ultrasonic wave without requiring, for example, a circuit or control required to receive the ultrasonic wave. On the other hand, the receiving element may be a unit having a simplified configuration optimized for reception as long as it can receive the ultrasonic wave without requiring, for example, a circuit or control required to oscillate the ultrasonic wave. In addition, since the unit constituting the receiving element may adopt any other element than the piezoelectric element, the degree of freedom of a configuration of the distance measurement device can be increased and the distance measurement device may adopt a simplified configuration. As described above, according to the above configuration, it is possible to make the distance measurement device have a simplified device configuration.

In addition, the configuration disclosed in the above embodiment (including other embodiments) may be applied in combination with the configuration disclosed in other embodiments as long as there is no inconsistency, and the embodiment dislocated in the present specification is merely given by way of example, and the embodiment of this disclosure is not limited thereto and may be appropriately modified within a scope not deviating from the object of this disclosure.

INDUSTRIAL APPLICABILITY

This disclosure may be applied to a distance measurement device.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that ell such variations, changes and equivalents which fall within the spirit and scope of the present invention as defined in the claims, be embraced thereby.

What is claimed is:

1. An obstacle detection sensor comprising:
   a controller configured to determine a detection condition of an obstacle on a road;
   a distance sensor unit configured to acquire distance information by oscillating a vibration wave and receiving a reflected wave of the oscillated vibration wave;
   a communication unit configured to communicate with an outside to acquire road surface information; and a storage unit configured to store detection relationship information for identifying the obstacle based on the distance information, wherein the controller compares the detection relationship information read from the storage unit with the distance information and the road surface information acquired from the distance sensor unit and the communication unit to determine the detection condition.

2. The obstacle detection sensor according to claim 1, wherein the communication unit communicates with a road information server having an external storage unit that stores therein the road surface information, and the controller acquires the road surface information from the external storage unit.

3. The obstacle detection sensor according to claim 2, wherein the controller transmits the distance information from the communication unit to the road information server and causes the road information server to record the distance information in the external storage unit.

4. The obstacle detection sensor according to claim 3, wherein the controller transmits the acquired distance information to the road information server when the acquired distance information changes by a predetermined amount or more compared to the distance information transmitted to the road information server immediately before.

5. The obstacle detection sensor according to claim 2 further comprising an environmental sensor unit configured to acquire an environmental value, wherein the controller corrects the distance information based on the environmental value acquired by the environmental sensor unit.

6. The obstacle detection sensor according to claim 2, wherein the communication unit communicates with an environmental information server that transfers an environmental value, and the controller acquires the environmental value from the environmental information server and corrects the distance information based on the environmental value.

7. The obstacle detection sensor according to claim 2, wherein the road information server is provided by cloud computing.

8. A distance measurement device comprising:
an oscillator configured to oscillate a carrier wave;
a pulse generator configured to output a unique code as a pulse signal;
a modulator configured to modulate the carrier wave and output a modulated wave corresponding to the pulse signal;
a piezoelectric element configured to oscillate and receive an ultrasonic wave corresponding to the modulated wave; and
a controller configured to calculate a distance based on the code obtained by demodulating a reflected wave of the ultrasonic wave received by the piezoelectric element,
wherein the modulator modulates the carrier wave using a plurality of modulation schemes at the same time.

9. The distance measurement device according to claim 8, wherein the modulator uses at least two modulation schemes among a phase modulation scheme, an amplitude modulation scheme, and a frequency modulation scheme as the plurality of modulation schemes.

10. The distance measurement device according to claim 9, wherein the modulator modulates the carrier wave using at least the amplitude modulation scheme and then converts the carrier wave into a burst wave corresponding to each pulse of the pulse signal, and the modulator shortens a burst length of the burst wave corresponding to the pulse at which an amplitude of the modulated wave converted by the amplitude modulation scheme is reduced compared to the burst length of the burst wave corresponding to the pulse at which the amplitude is increased.

11. A distance measurement device comprising:
an oscillator configured to oscillate a carrier wave;
a modulator configured to output a modulated wave obtained by adding an identification signal to the carrier wave by a predetermined scheme;
an oscillation element configured to oscillate an ultrasonic wave corresponding to the modulated wave;
a receiving element configured to receive the ultrasonic wave;
a demodulation unit configured to demodulate the ultrasonic wave received by the receiving element; and
a controller configured to determine a scheme of the demodulated ultrasonic wave,
wherein the controller causes the receiving element to receive the ultrasonic wave beforehand when the modulator outputs the modulated wave, causes the demodulation unit to demodulate the received ultrasonic wave to acquire a demodulated signal, and determines a scheme of the demodulated signal to output information about the scheme to the modulator, and
the modulator adds the identification signal to the carrier wave by a scheme different from the scheme of the demodulated signal based on the information and outputs the modulated wave.

12. The distance measurement device according to claim 11, wherein the modulator outputs the modulated wave to which the identification signal having a bit array different from that of the demodulated signal is added.

13. The distance measurement device according to claim 12, wherein the bit array has a bit length different from that of the demodulated signal.

14. The distance measurement device according to claim 11, wherein the modulator outputs the modulated wave which is modulated by a scheme different from a modulation scheme for demodulation by the demodulation unit.

15. The distance measurement device according to claim 11, wherein
the oscillation element includes a piezoelectric element unit, and
the receiving element is a unit different from the piezoelectric element unit.

* * * * *